(12) United States Patent
Ishii

(10) Patent No.: US 7,821,219 B2
(45) Date of Patent: Oct. 26, 2010

(54) MOTOR CONTROL APPARATUS AND MOTOR CONTROL METHOD

(75) Inventor: Shinji Ishii, Yokohama (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 305 days.

(21) Appl. No.: 12/076,895

(22) Filed: Mar. 25, 2008

(65) Prior Publication Data
US 2008/0290827 A1    Nov. 27, 2008

(30) Foreign Application Priority Data
Mar. 27, 2007    (JP) ............................. 2007-082068

(51) Int. Cl.
   *G05B 11/18*    (2006.01)
(52) U.S. Cl. ................... 318/590; 318/677; 318/491
(58) Field of Classification Search ................ 318/590, 318/677, 491, 596, 671, 432, 400.34, 376, 318/400.04, 400.41, 433; 388/811, 910
See application file for complete search history.

(56) References Cited

U.S. PATENT DOCUMENTS

| 5,892,347 A * | 4/1999 | Zweighaft et al. ........... 318/590 |
| 7,363,993 B2 | 4/2008 | Ishii |

FOREIGN PATENT DOCUMENTS

| JP | 02-179297 A | 7/1990 |
| JP | 2000-116190 A | 4/2000 |
| JP | 3332226 | 7/2002 |
| JP | 2004-135437 A | 4/2004 |
| JP | 2005-138630 | 6/2005 |
| JP | 2005-138631 A | 6/2005 |
| JP | 2006-160030 A | 6/2006 |
| JP | 2007-060852 A | 3/2007 |
| WO | WO 2006/135797 A2 | 12/2006 |

* cited by examiner

*Primary Examiner*—Karen Masih
(74) *Attorney, Agent, or Firm*—Kenyon & Kenyon LLP

(57) ABSTRACT

Size and weight reduction of a motor-driven vehicle, robot or the like is achieved. A current command Iref from a speed feedback gain is supplied to each of circuits with coefficients of $\sin(\theta m)$, $\sin(\theta m+2\pi/3)$ and $\sin(\theta m-2\pi/3)$ to generate three-phase signals. The three-phase signals are respectively supplied to current control gains through adder-subtracters. Further, signals from motor constants are added together by an adder to produce motor torque. Furthermore, coil voltages output from adders pass through diodes and are then added together by an adder, and the signal is supplied to a regenerative voltage determiner. When a regenerative voltage becomes excessive, in-phase current Idc is supplied through a regeneration control gain to adder-subtracters.

8 Claims, 22 Drawing Sheets

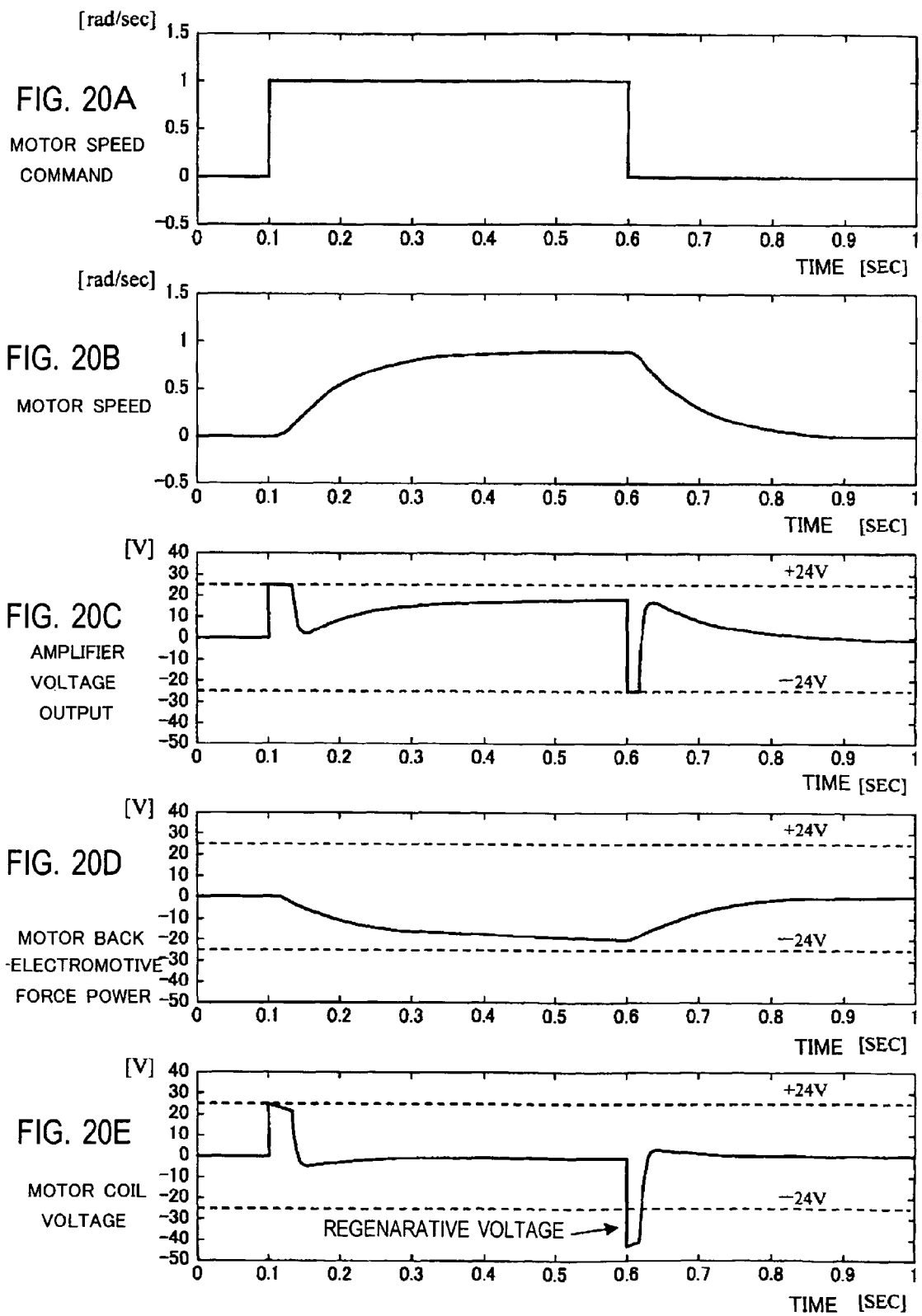

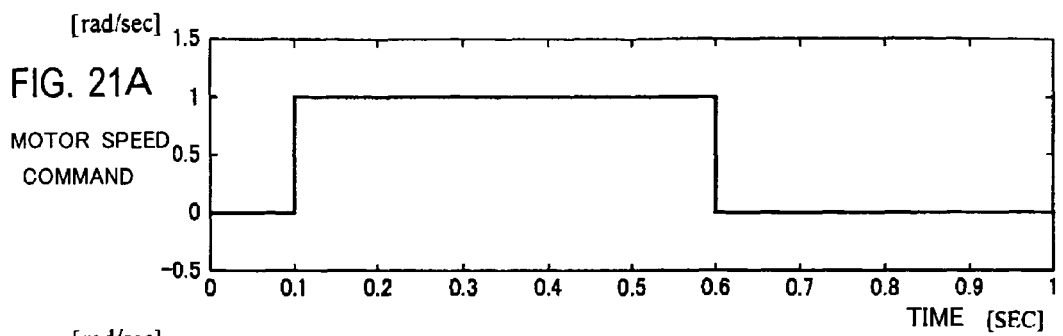
FIG. 21A MOTOR SPEED COMMAND
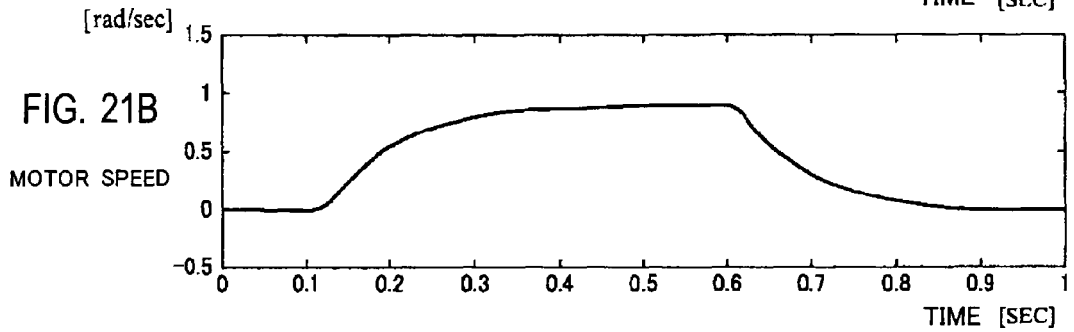
FIG. 21B MOTOR SPEED
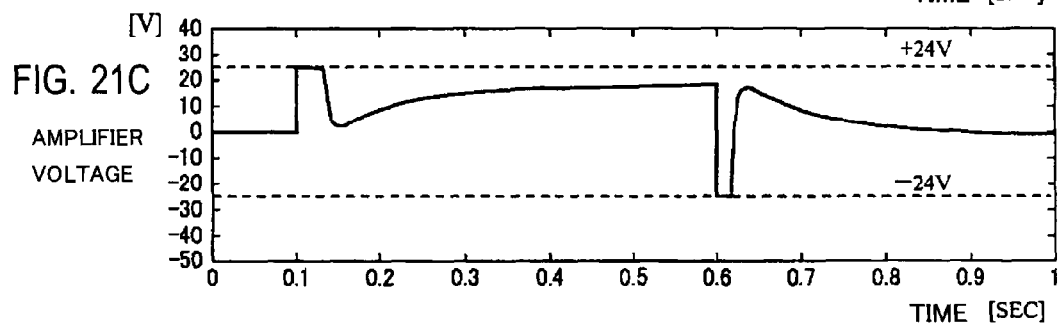
FIG. 21C AMPLIFIER VOLTAGE
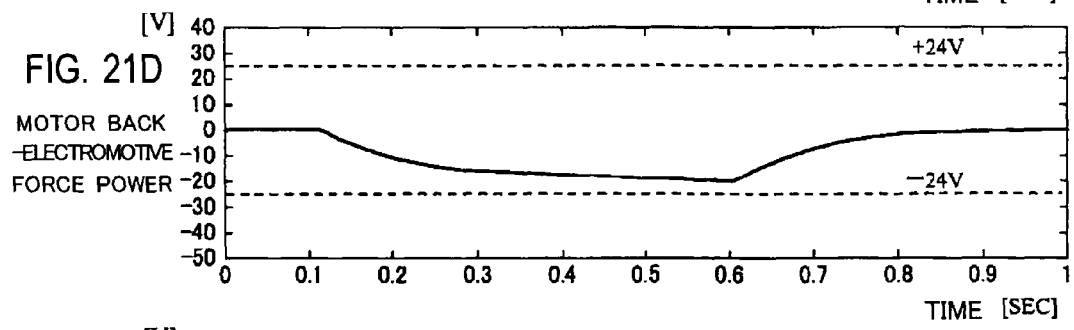
FIG. 21D MOTOR BACK -ELECTROMOTIVE FORCE POWER
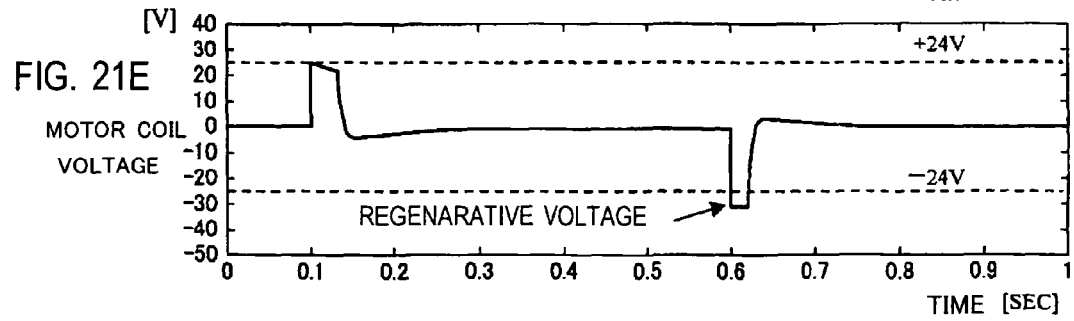
FIG. 21E MOTOR COIL VOLTAGE

REGENERATIVE CURRENT

MOTOR COIL VOLTAGE

MOTOR CONTROL APPARATUS AND MOTOR CONTROL METHOD

BACKGROUND OF THE INVENTION

1. Field of the Invention

The present invention relates to a motor control apparatus and a motor control method which are suitable for use in controlling a motor in an electric vehicle, an articulated robot system or the like. Particularly, the present invention enables an electric motor to generate a regenerative power with the suitable consumption.

2. Description of Related Art

The inventors of the present invention have proposed a two-wheel vehicle for assisting people movement (cf. e.g. Japanese Unexamined Patent Application Publication No. 2005-138631).

Further, a technique of consuming a regenerative power which is generated by a motor has been proposed (cf. e.g. Japanese Unexamined Patent Application Publication No. 2000-116190).

FIG. 13 shows the configuration of a vehicle having a wheel configuration (two wheels or three or more wheels) to which the present invention is applicable and employing inverted pendulum control with a main body having a gyro sensor and an acceleration sensor. Referring to FIG. 13, a step 2 on which a passenger stands is placed lower than the axle of left and right wheels 1L and 1R. The step 2 includes a posture sensor circuit 3 which has a gyro sensor and an acceleration sensor, and a central control device 5 which controls motors 4L and 4R that drive the wheels 1L and 1R according to the output of the posture sensor circuit 3.

The step 2 further includes a battery 6. The battery supplies a power to the posture sensor circuit 3, the motors 4L and 4R, and the central control device 5. Although the above description is given on the wheel configuration (two or more wheels) to which the present invention is applicable, the motor control apparatus and the motor control method of the present invention may be applied to other electric vehicle, articulated robot system and so on.

FIG. 14 is a block diagram showing the configuration of a control system according to a related art. Referring to FIG. 14, the signals which are detected by the gyro sensor 31 and the acceleration sensor 32 in the posture sensor circuit 3 are digitalized by analog-to-digital converters (ADCs) 33 and 34, respectively, and input to a central processing unit (CPU) 35. The information signal which is generated therein is transmitted to the central control device 5 through a serial input/output (SIO) 36.

In the central control device 5, the information signal from the posture sensor circuit 3 is received through an SIO 51. Further, angle information from a brake lever 52 and angle information from a turning lever 53 which controls the turning of a vehicle are supplied to ADCs 54 and 55, respectively, of the central control device 5. Based on the information, a CPU 56 and a memory 57 in the central control device 5 generate a torque command signal. The torque command signal is transmitted through SIOs 58 and 59 to control devices 41L and 41R of the motors 4L and 4R, respectively.

The motors 4L and 4R include encoders 42L and 42R, respectively, and the rotation of the motors 4L and 4R is fed back to the control devices 41L and 41R, thereby enabling stable control. Further, a secondary battery 61 is placed as the battery 6. For example, 24-volt direct current power from the secondary battery 61 is directly supplied to the control devices 41L and 41R, and it is also converted into 5-volt direct current power by a DC/DC converter 62 and supplied to the central control device 5.

FIG. 15 is a schematic diagram showing a typical motor connection. In this connection, one ends of motor coils 43U, 43V and 43W are connected with one another, and drive current of each phase is supplied to the other ends of the motor coils 43U, 43V and 43W. The phase current (Iu, Iv and Iw) is fed so that the sum total is (Iu+Iv+Iw=0), and the three-phase current with the current vector at a right angle with respect to the magnetic direction of a permanent magnet is fed to thereby generate rotation torque. In order to control the torque in this manner, it is necessary to control the three-phase current to have the following relationships:

$$Iu = I0 * \sin(\theta m)[A] \qquad \text{Expression 1}$$

$$Iv = I0 * \sin(\theta m + 2\pi/3)[A] \qquad \text{Expression 2}$$

$$Iw = I0 * \sin(\theta m - 2\pi/3)[A] \qquad \text{Expression 3}$$

where θm is a rotor magnetic pole position [rad] with respect to a stator. The current is thereby controlled in such a way that a current axis and a magnetic pole axis make a right angle, using the Fleming's left-hand rule.

FIG. 16 is a block diagram of an inverter circuit to generate the three-phase current having the relationship of the above expressions 1 to 3. Referring to FIG. 16, pulse width modulation (PWM) signals PWMu, PWMv and PWMw, which correspond to phase current (Iu, Iv, Iw), are supplied to field-effect transistors (FETs) 44U, 44V and 44W which are placed between one ends of the motor coils 43U, 43V and 43W and a ground, respectively, and also supplied to FETs 46U, 46V and 46W of which phases are shifted through inverters 45U, 45V and 45W and which are placed between one ends of the motor coils 43U, 43V and 43W and a power supply. Such a circuit configuration enables the three-phase current having the relationship of the above expressions 1 to 3 to flow.

The current vector control of the three-phase coils of an AC motor can be equivalently performed in the same manner as that of a DC motor. FIG. 17 shows a mathematical model of a motor coil of the equivalent DC motor. Referring to FIG. 17, a speed control command is supplied to a speed feedback gain 402 through a subtracter 401 and further supplied to a current control gain 404 through a subtracter 403. The current value is converted into a DC±24 volt power in an output amplifier 405 and it is supplied through an adder 406 as a coil voltage to a motor coil 407.

The current of the motor coil 407 is fed back to the subtracter 403 and also produces torque through a motor constant 408. The torque is acquired as a rotation speed (motor output) through a motor rotor/load moment 409. The rotation speed is fed back to the adder 406 through a motor back-electromotive force coefficient 410 and also fed back to the subtracter 401. The feedback control of motor driving is performed in this manner. FIG. 17 shows the coefficient of each component.

When such a motor is used in a vehicle, a robot or the like, if a driving target decelerates and a mechanical energy due to an inertial force is transferred to the motor, the motor converters the mechanical energy into an electric energy by the Fleming's right-hand rule, thereby generating a regenerative power. Because the motor thereby acts as an electric generator, a power supply voltage of the inverter circuit increases. It is thereby necessary to connect an external regenerative resistor to a power supply as shown in FIG. 18 so as to convert a regenerative power energy into a thermal energy by the regenerative resistor in order to suppress an increase in a voltage.

FIG. 19 shows a speed feedback system using a motor. As a feedback signal, a gyro sensor signal and an acceleration sensor signal, in addition to a speed signal, can be treated in the same manner. FIGS. 20A to 20E are waveform charts showing the control signals when a command which causes a motor to start rotating and then to stop after a certain period of rotation is given in the control system of FIG. 19. Specifically, FIG. 20A shows a motor speed command, FIG. 20B shows a motor speed, FIG. 20C shows an amplifier voltage output, FIG. 20D shows a motor back-electromotive force, and FIG. 20E shows a motor coil voltage.

As shown in the motor coil voltage in FIG. 20E, a coil voltage is such a voltage that a back-electromotive force is added to a power supply voltage upon deceleration. Thus, a voltage that is two times larger than a power supply voltage at maximum is generated during deceleration. Accordingly, if a motor is used in a system such as a vehicle, the motor acts as an electric generator when a vehicle moves down a downward slope, so that a voltage undesirably increases to exceed a withstand voltage. It is therefore necessary to create a mechanism for converting a kinetic energy into a thermal energy by a regenerative resistor in order to suppress an increase in a voltage.

In the system of FIG. 18, the coil voltage which is output from the adder 406 is supplied to a regenerative voltage detection circuit 411 and a regenerative voltage is thereby detected. When the regenerative voltage becomes higher than a prescribed value, a switching device 412 becomes conductive, so that an excessive regenerative voltage is supplied to a regenerative resistor or capacitor 413. In this manner, in a related art, a regenerative power is converted into a thermal energy by the regenerative resistor, or a regenerative energy is stored in a regenerative capacitor, thereby suppressing an increase in a voltage.

FIGS. 21A to 21E are waveform charts showing the signals in the case of using the circuit configuration of FIG. 18. Specifically, FIG. 21A shows a motor speed command, FIG. 21B shows a motor speed, FIG. 21C shows an amplifier voltage output, FIG. 21D shows a motor back-electromotive force, and FIG. 21E shows a motor coil voltage. As shown in the motor coil voltage in FIG. 21E, the fluctuation of a power supply voltage due to a back-electromotive force is suppressed. FIG. 22A shows the waveform of generated regenerative current, and FIG. 22B shows the waveform of the motor coil voltage. FIGS. 22A and 22B show that the fluctuation of the motor coil voltage is smaller than the generated regenerative current.

Thus, in the configuration of an apparatus according to a related art, an increase in a power supply voltage is suppressed with the use of the built-in regenerative resistor or capacitor 413 as shown in FIG. 13 or 14. However, the regenerative resistor or capacitor 413 has a large weight and volume. This causes an increase in the mass or size of a vehicle, robot or the like in which the above motor is used.

As described in the foregoing, a related art uses a regenerative resistor or a capacitor with a large weight and volume in order to suppress an increase in a power supply voltage. This hinders the achievement of size or weight reduction of a vehicle, robot or the like in which the motor is used. In light of the foregoing, there is a need for eliminating a generated regenerative power without the use of a regenerative resistor or a capacitor.

SUMMARY OF THE INVENTION

According to an embodiment of the present invention, there is provided a control apparatus of a motor that drives a permanent magnet using a plurality of drive coils, which includes a plurality of drive coils connected in such a way that drive current is supplied independently to each of the plurality of drive coils, and a unit of equally supplying a regenerative power generated by the motor to the plurality of drive coils. This enables the elimination of a generated regenerative power without the use of a regenerative resistor or capacitor.

The motor may have three-phase drive coils, and a regenerative power generated by the motor may be equally supplied to the three-phase drive. This eliminates the use of a regenerative resistor or capacitor.

Further, phase-shifted drive current may be supplied to each of the plurality of drive coils, and the drive current may be controlled so as to control drive torque. This achieves size and weight reduction of a vehicle, a robot or the like in which the motor is used.

Furthermore, the regenerative power that is equally supplied to the plurality of drive coils may be modulated at an audible frequency, so that an audible sound is generated by the motor. This enables the generation of a warning sound or the like.

According to another embodiment of the present invention, there is provided a control method of a motor that is driven by a plurality of drive coils, which includes connecting a plurality of drive coils in such a way that drive current is supplied independently to each of the plurality of drive coils, and equally supplying a regenerative power generated by the motor to the plurality of drive coils. This eliminates a regenerative power generated by the motor and prevents the regenerative power elimination from affecting torque control.

The present invention thereby eliminates a regenerative power by sending it through motor coils without affecting torque control. It is thereby possible to eliminate the use of a large weight, large volume regenerative resistor or capacitor and thereby achieve size and weight reduction of a vehicle, a robot or the like in which the motor is used.

The above and other objects, features and advantages of the present invention will become more fully understood from the detailed description given hereinbelow and the accompanying drawings which are given by way of illustration only, and thus are not to be considered as limiting the present invention.

BRIEF DESCRIPTION OF THE DRAWINGS

FIG. 20A is a view to describe the same;

FIG. 20B is a view to describe the same;

FIG. 20C is a view to describe the same;

FIG. 20D is a view to describe the same;

FIG. 20E is a view to describe the same;

FIG. 21A is a view to describe the same;

FIG. 21B is a view to describe the same;

FIG. 21C is a view to describe the same;

FIG. 21D is a view to describe the same;

FIG. 21E is a view to describe the same;

DETAILED DESCRIPTION OF THE PREFERRED EMBODIMENTS

Figure 1:
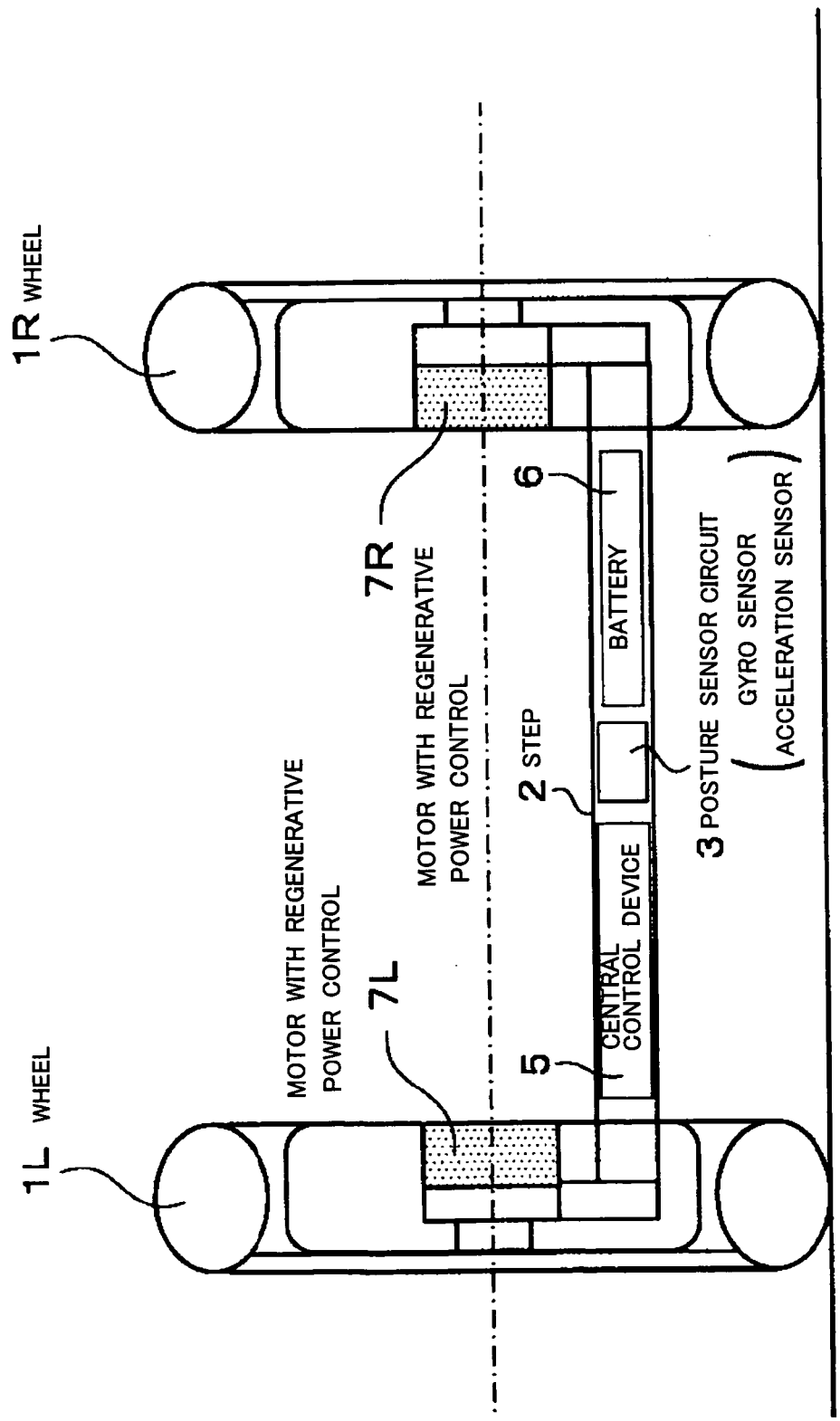
FIG. 1 is a schematic diagram of a wheel configuration to which the motor control apparatus and the motor control method according to an embodiment of the present invention is applied.

An embodiment of the present invention is described hereinafter with reference to the drawings. FIG. 1 schematically shows a wheel configuration to which the motor control apparatus and the motor control method according to an embodiment of the present invention is applied. In the following description, the same elements as in the configuration described in the above related art are denoted by the same reference symbols.

Referring to FIG. 1, a step 2 on which a passenger stands is placed lower than the axle of left and right wheels 1L and 1R. The step 2 includes a posture sensor circuit 3 which has a gyro sensor and an acceleration sensor, and a central control device 5 which controls motors 7L and 7R that drives the wheels 1L and 1R according to the output of the posture sensor circuit 3. The step 2 further includes a battery 6, from which a power is supplied to the posture sensor circuit 3, the motors 7L and 7R and the central control device 5.

Figure 13:
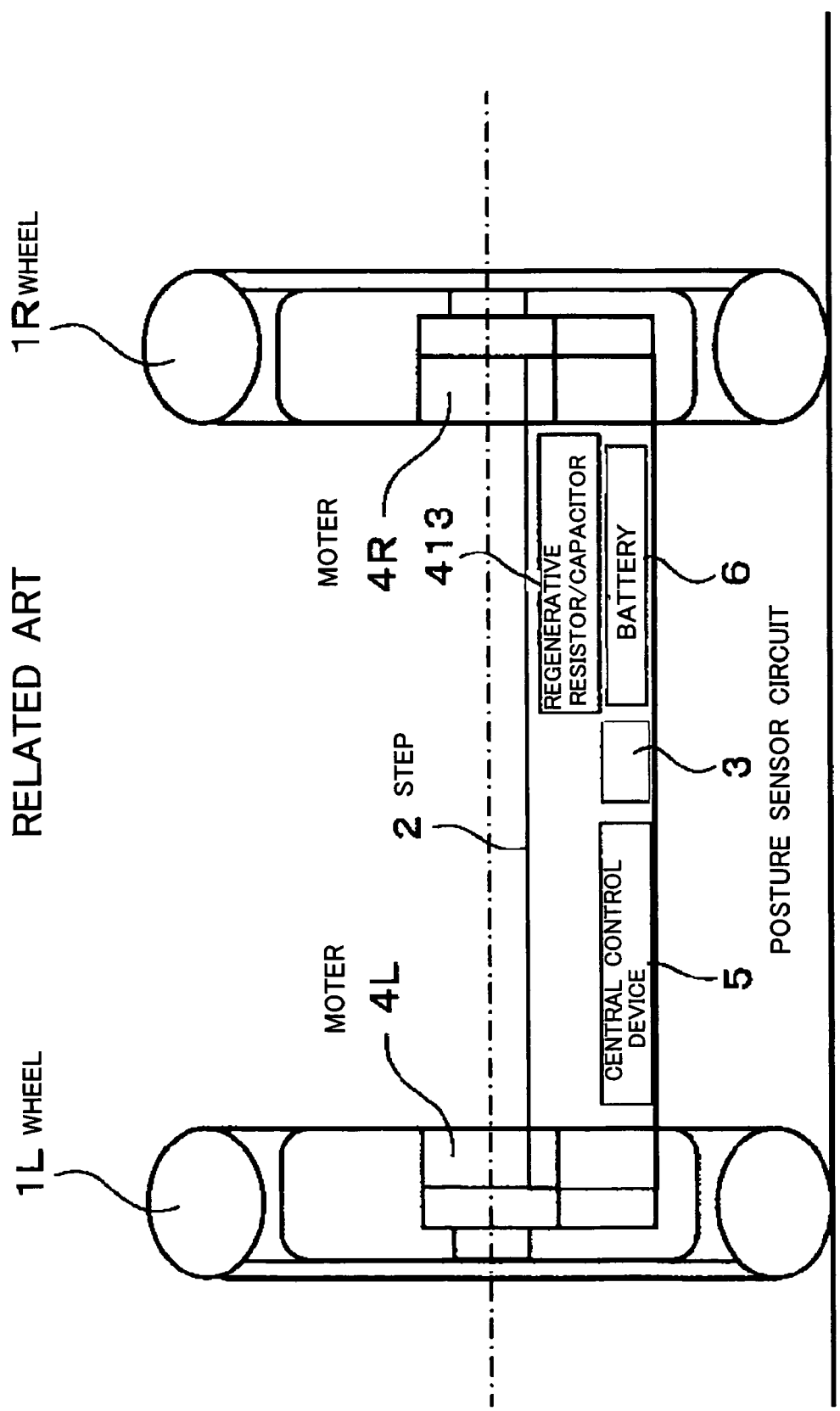
FIG. 13 is a schematic diagram of a wheel configuration according to a related art.
Figure 14:
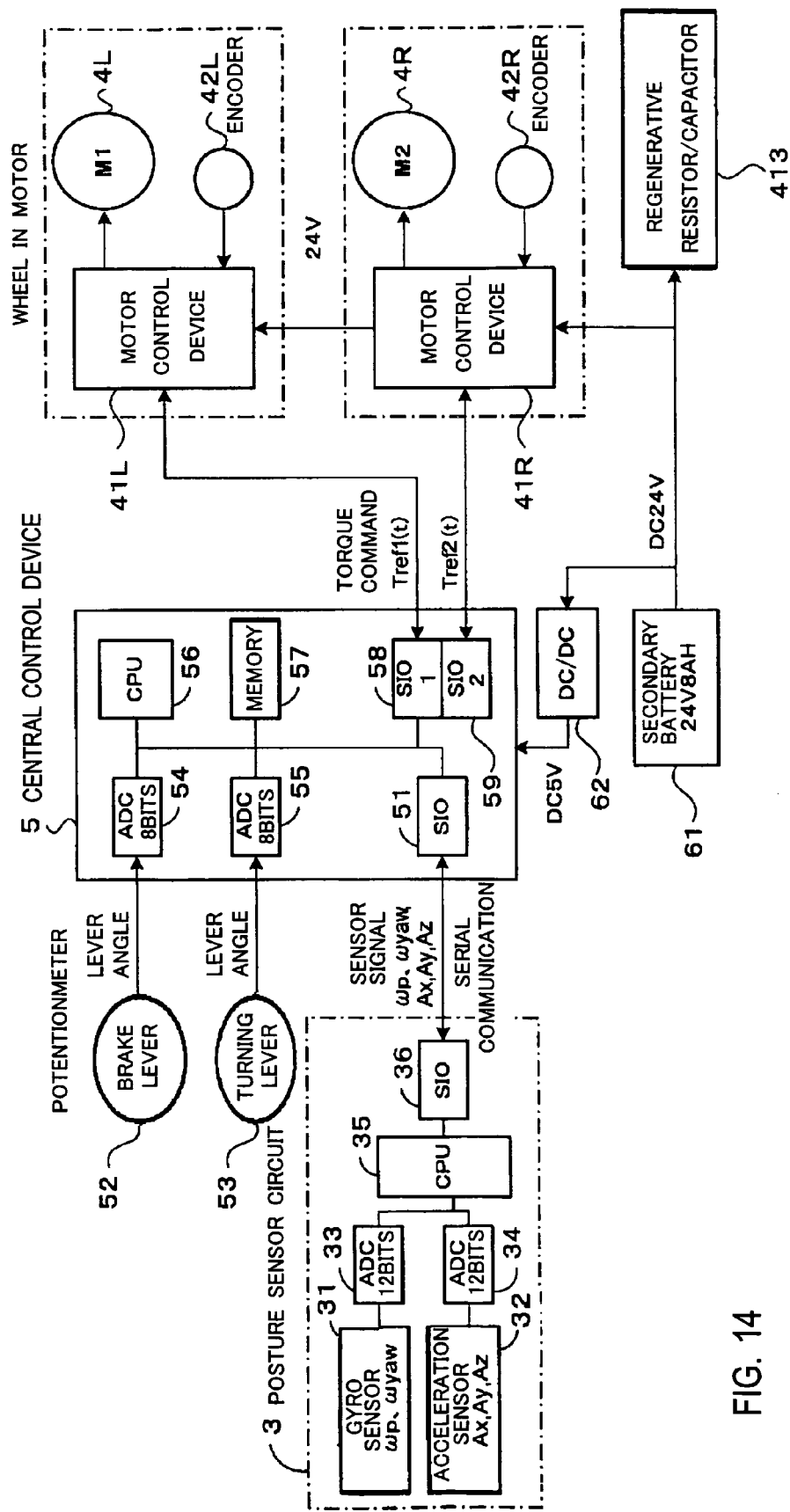
FIG. 14 is a view to describe the operation of the same.
Figure 15:
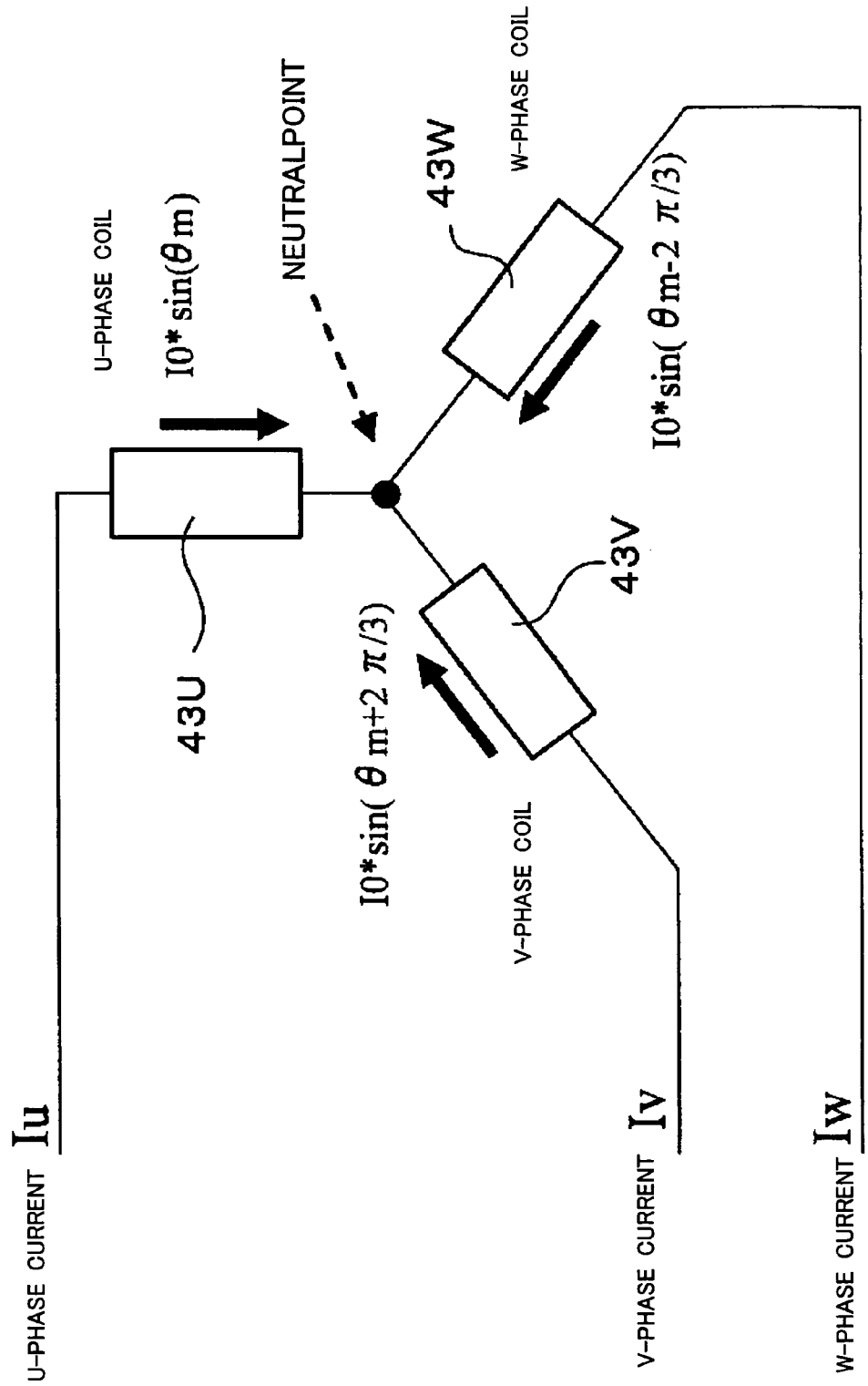
FIG. 15 is a view to describe the same.
Figure 16:
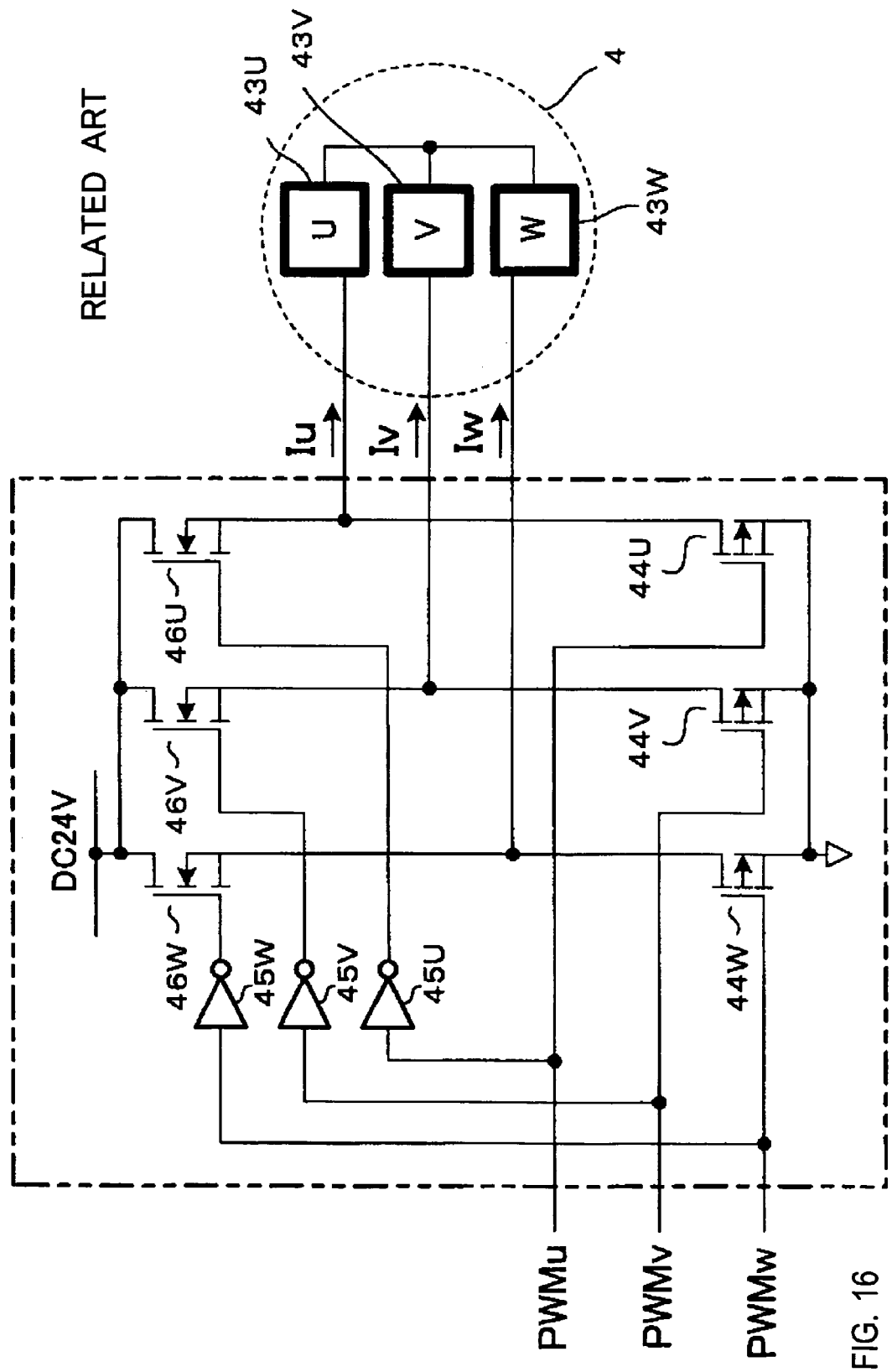
FIG. 16 is a view to describe the same.
Figure 17:
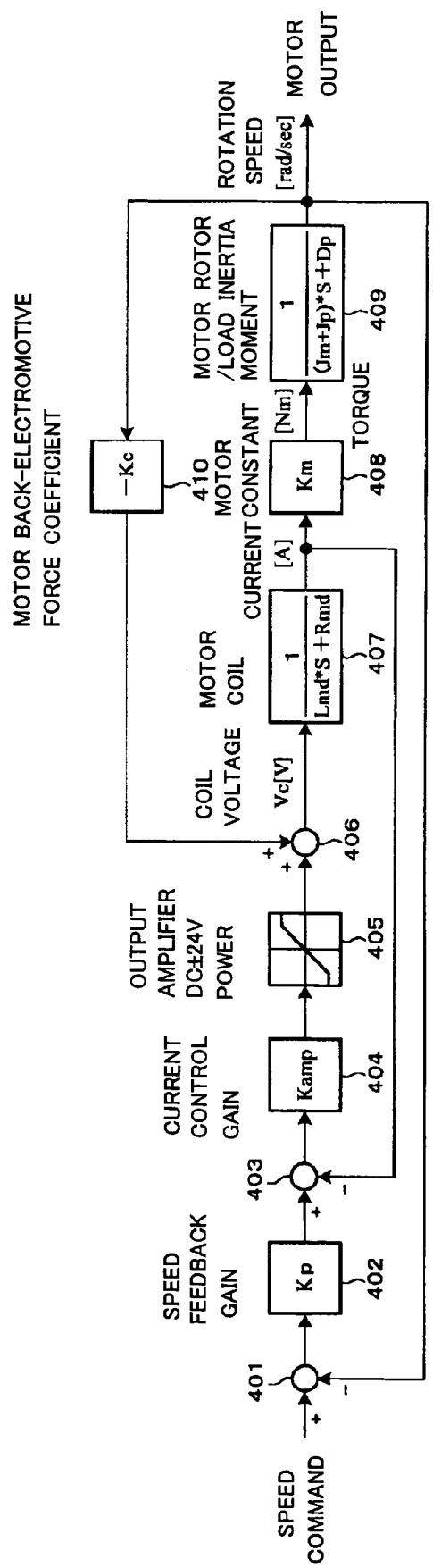
FIG. 17 is a block diagram showing a control system according to a related art.
Figure 18:
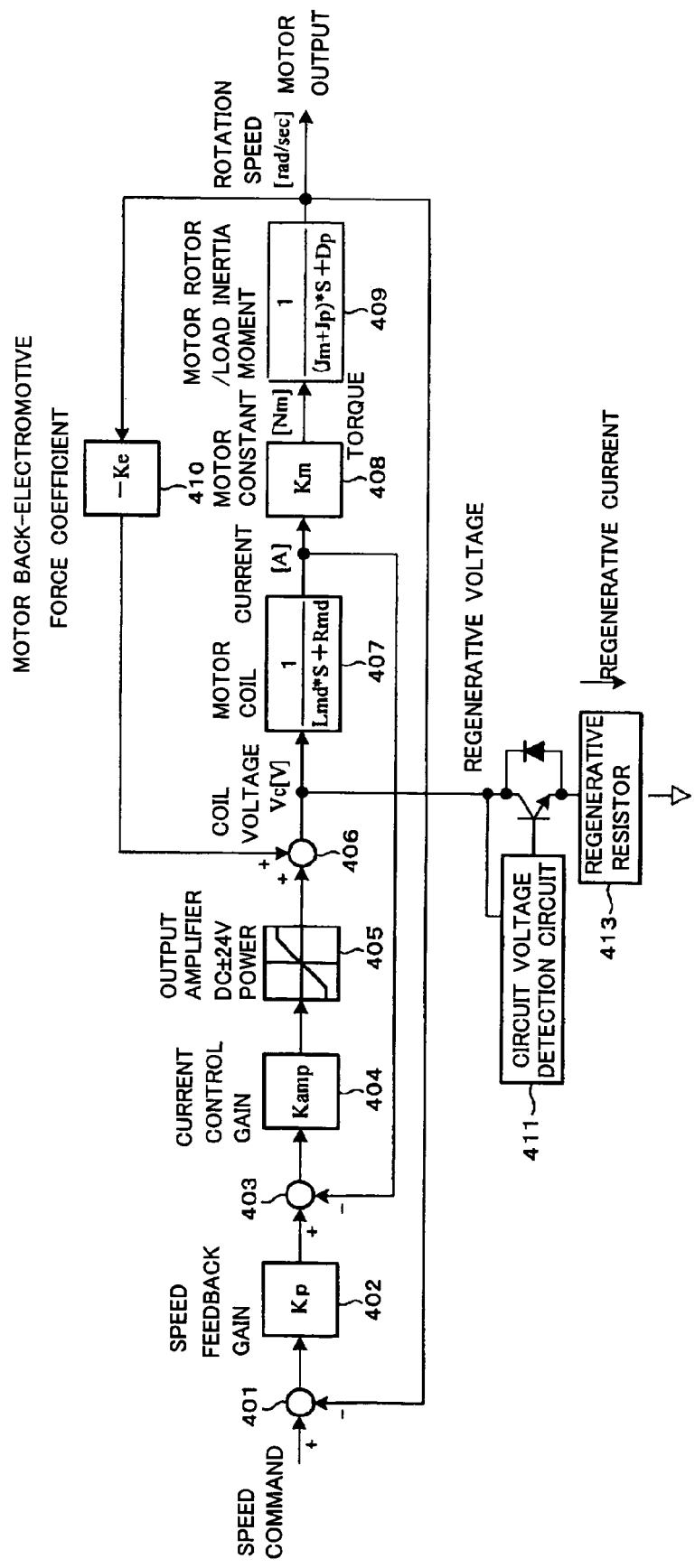
FIG. 18 is a block diagram showing a control system according to a related art.
Figure 19:
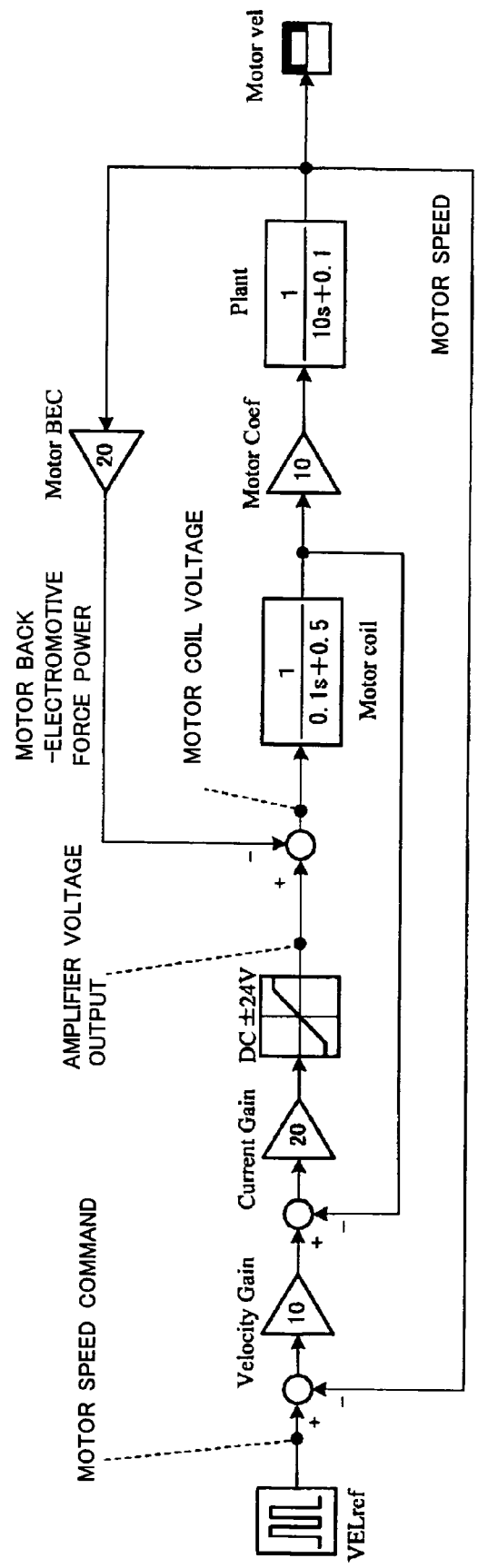
FIG. 19 is a view to describe the same.
Figure 22A:
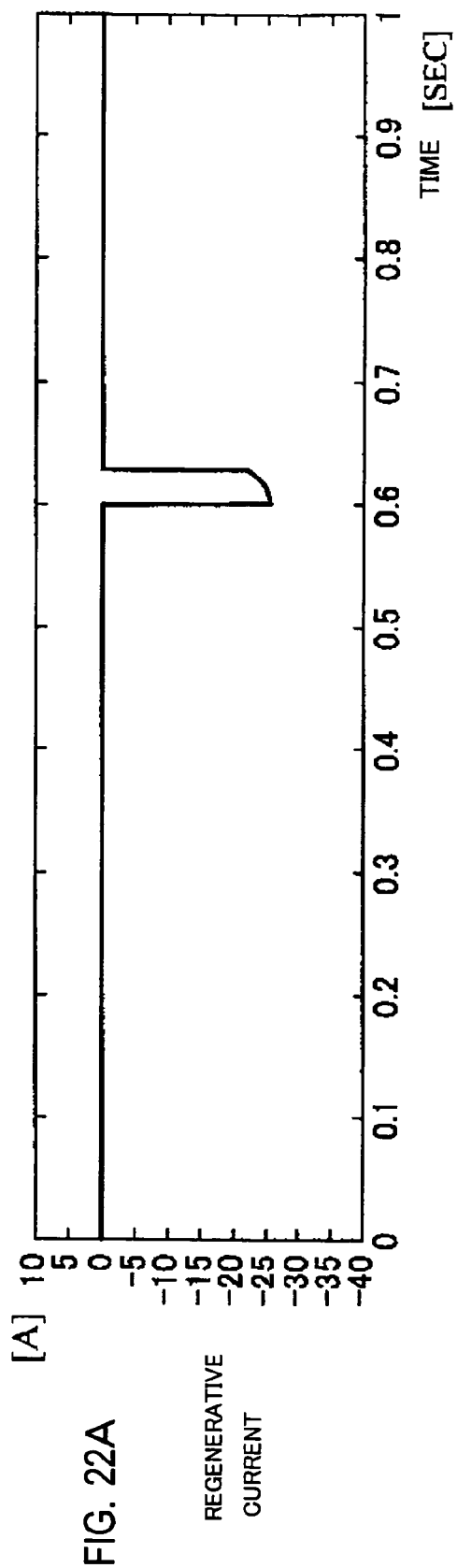
FIG. 22A is a view to describe the same.
Figure 22B:
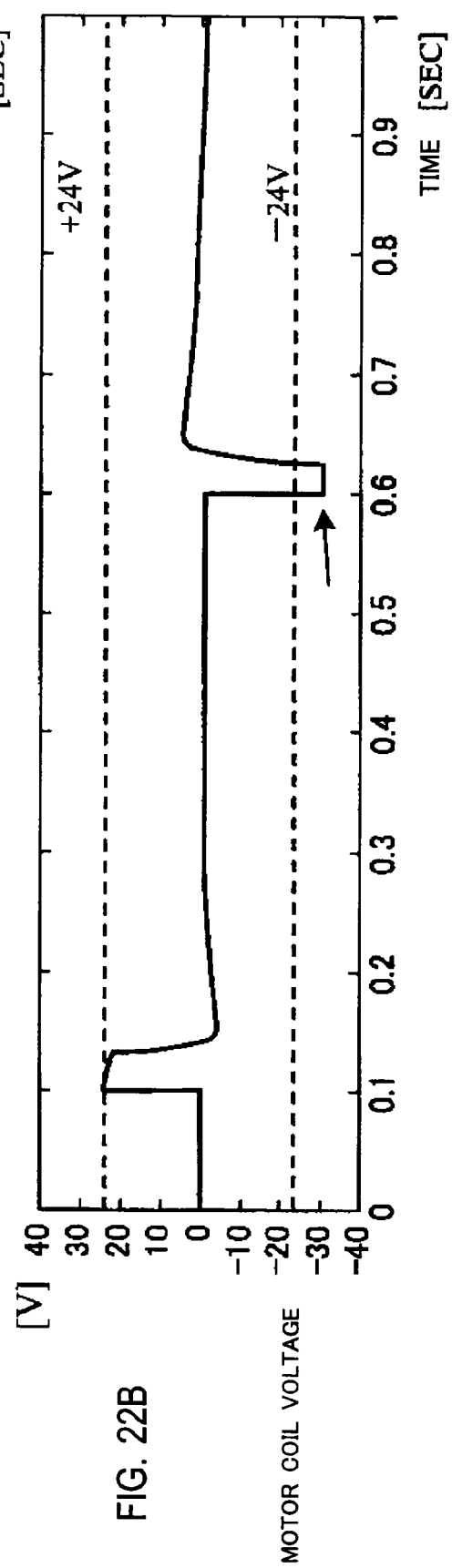
FIG. 22B is a view to describe the same.

The configuration of FIG. 1 does not include the regenerative resistor or capacitor 413, which is described in the configuration of the related art of FIG. 13. The motors 7L and 7R include a regenerative power control circuit as a control apparatus. Although the above description is given on the case where the present invention is applied to the wheel configuration (two wheels or three or more wheels), the motor control apparatus and the motor control method of the present invention may be applied to other electric vehicle, articulated robot system and so on.

Figure 2:
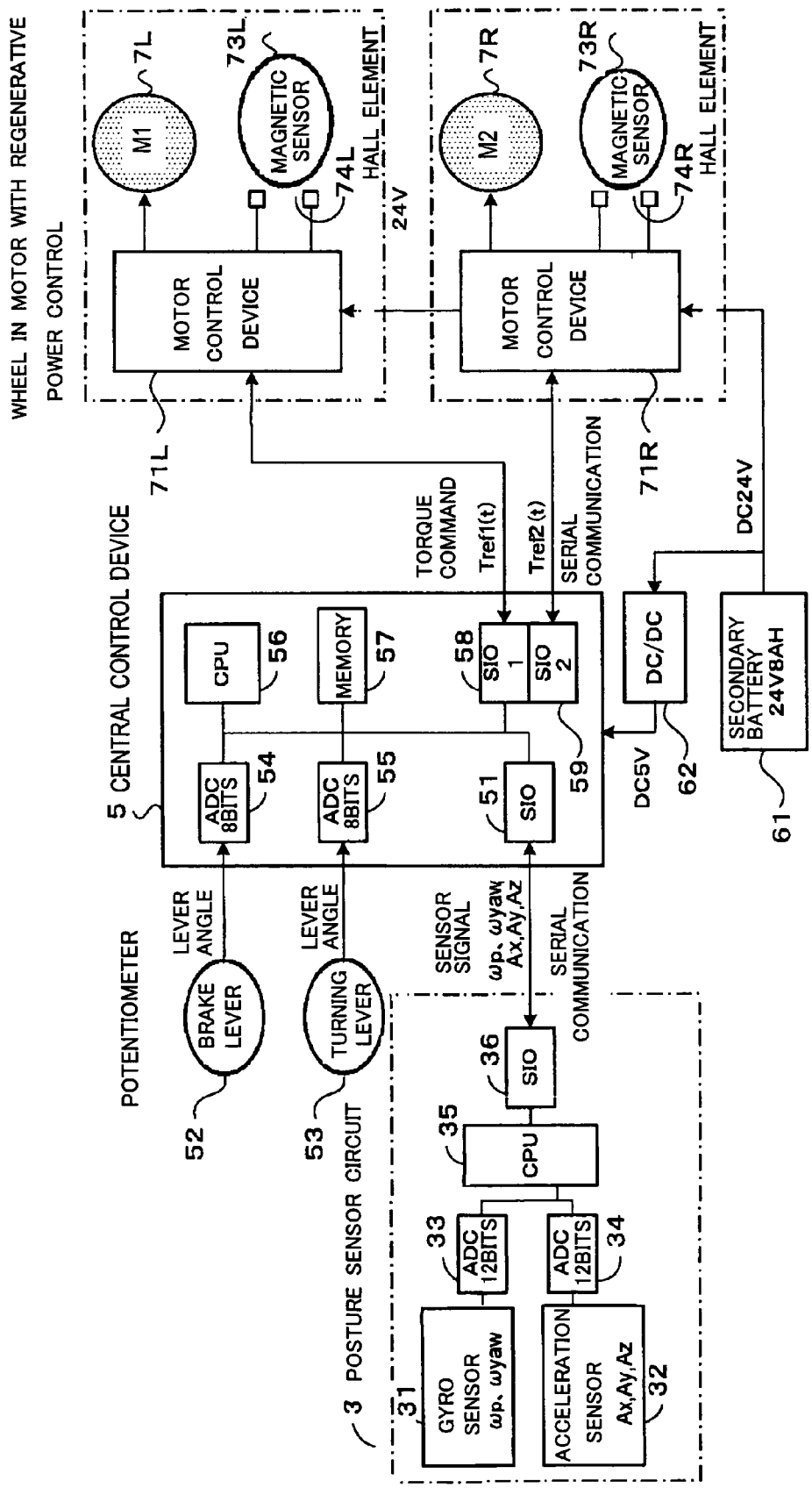
FIG. 2 is a block diagram showing the configuration of a control system using the motor control apparatus and the motor control method according to an embodiment of the present invention.

FIG. 2 is a block diagram showing the configuration of a control system which employs the motor control apparatus and the motor control method according to an embodiment of the present invention. Referring to FIG. 2, the signals which are detected by a gyro sensor 31 and an acceleration sensor 32 in the posture sensor circuit 3 are digitalized by analog-to-digital converters (ADCs) 33 and 34, respectively, and input to a central processing unit (CPU) 35. The information signal which is generated therein is transmitted to the central control device 5 through a serial input/output (SIO) 36.

In the central control device 5, the information signal from the posture sensor circuit 3 is received through an SIO 51. Further, angle information from a brake lever 52 and angle information from a turning lever 53 which controls the turning of a vehicle are supplied to ADCs 54 and 55, respectively, of the central control device 5. Based on the information, a CPU 56 and a memory 57 in the central control device 5 generate a torque command signal. The torque command signal is transmitted through SIOs 58 and 59 to control devices 71L and 71R of the motors 7L and 7R, respectively.

Figure 3:
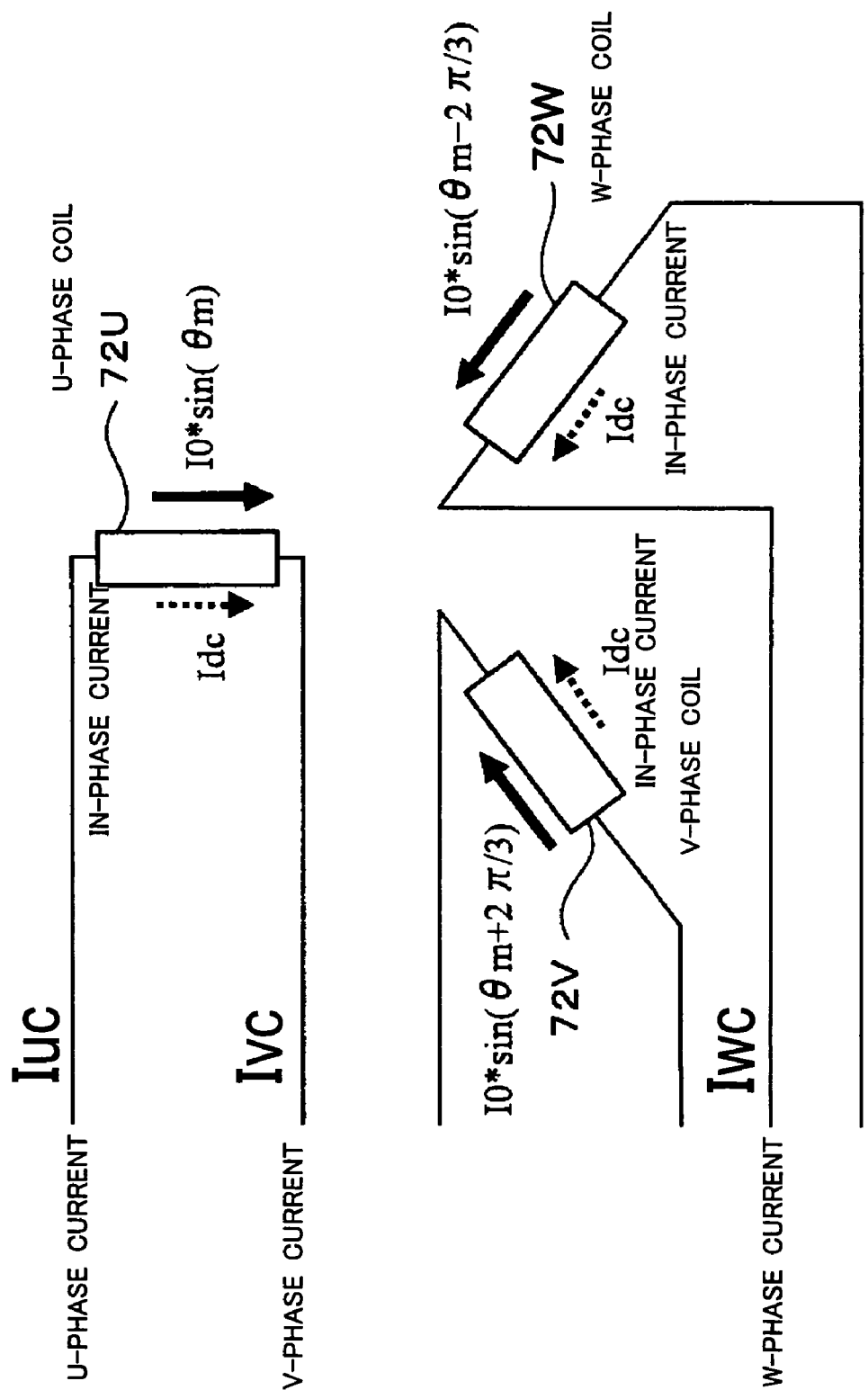
FIG. 3 is a view to describe the same.

In the control devices 71L and 71R, the configuration which is disclosed in Japanese Patent No. 3332226 by the inventors of the present invention is employed. Specifically, in this configuration, motor coils 72U, 72V and 72W are connected in such a way that drive current is supplied independently as shown in FIG. 3. Referring back to FIG. 2, magnetic sensors 73L and 73R and hall elements 74L and 74R are placed in the rotation axes of the motors 7L and 7R, respectively, so that the rotation phase of the motors 7L and 7R is detected and supplied to the control devices 71L and 71R. The three-phase drive current is thereby generated by the control devices 71L and 71R.

Figure 4:
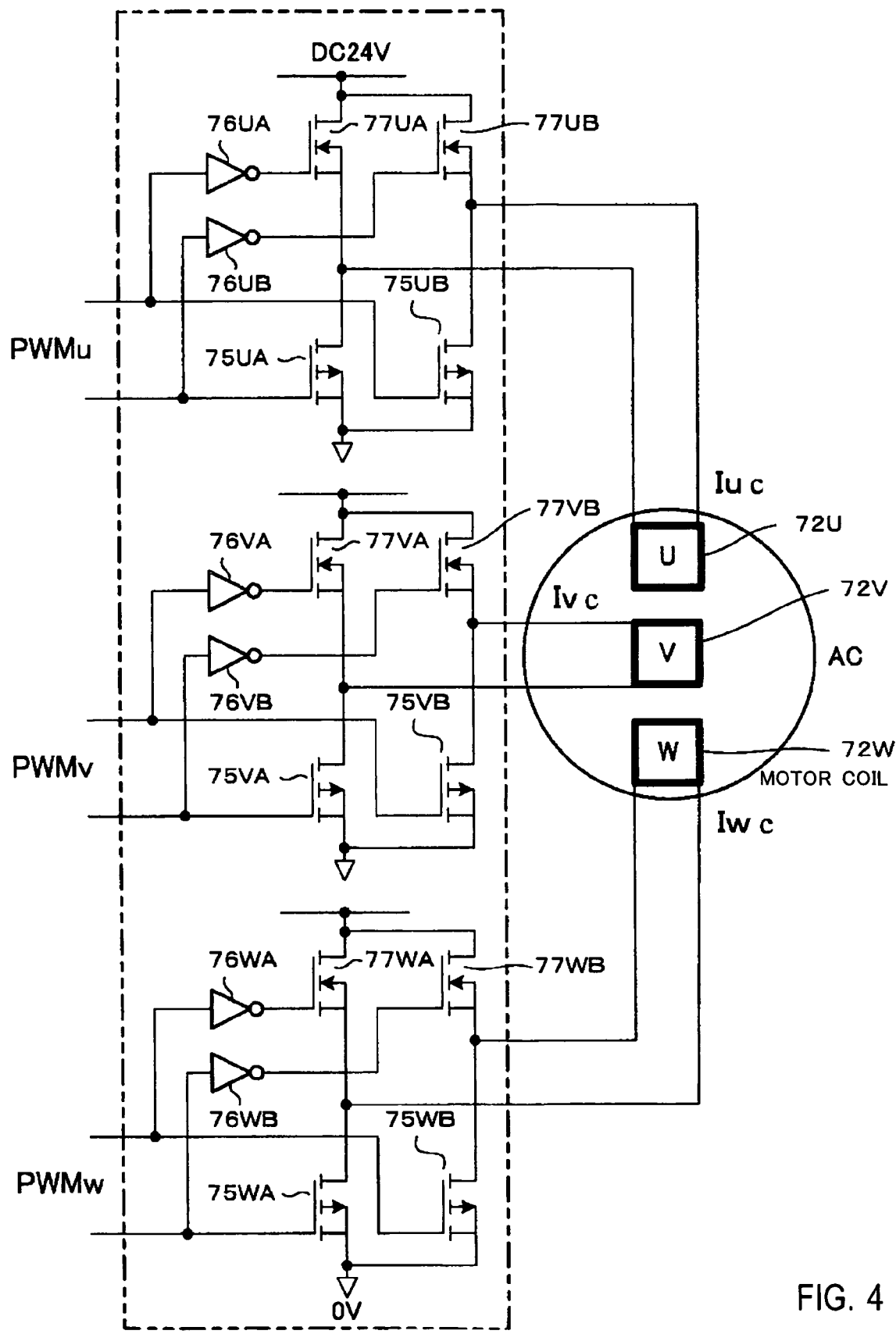
FIG. 4 is a view to describe the same.

FIG. 4 shows the block diagram showing an inverter circuit. Referring to FIG. 4, a current circuit is placed independently for each of the phase current (Iu, Iv and Iw). PWM signals (PWMu, PWMv, PWMw), which correspond to each phase current, are supplied to FETs 75UA, 75UB, 75VA, 75VB, 75WA and 75WB placed between the both ends of the motor coils 72U, 72V and 72W and the ground, respectively, and also supplied to FETs 77UA, 77UB, 77VA, 77VB, 77WA and 77WB placed between the both ends of the motor coils 72U, 72V and 72W and the ground through inverters 76UA, 76UB, 76VA, 76VB, 76WA and 76WB, respectively.

In the above-described motor configuration, torque is controlled by feeding the three-phase current (cf. Expressions 1, 2 and 3) with the current vector at a right angle with respect to the magnetic direction of a permanent magnet as described in the above related art. On the other hand, in the above-described motor connection, if the in-phase current Idc is applied to the motor coils 72U, 72V and 72W as shown in FIG. 3, the torque which is produced by the current has a vectorial sum of 0, so that it does not interfere with rotation torque. In this principle of torque control, it is possible to suppress an increase in a regenerative voltage without causing interference with torque current by feeding a regenerative power to the motor coils.

Figure 5:
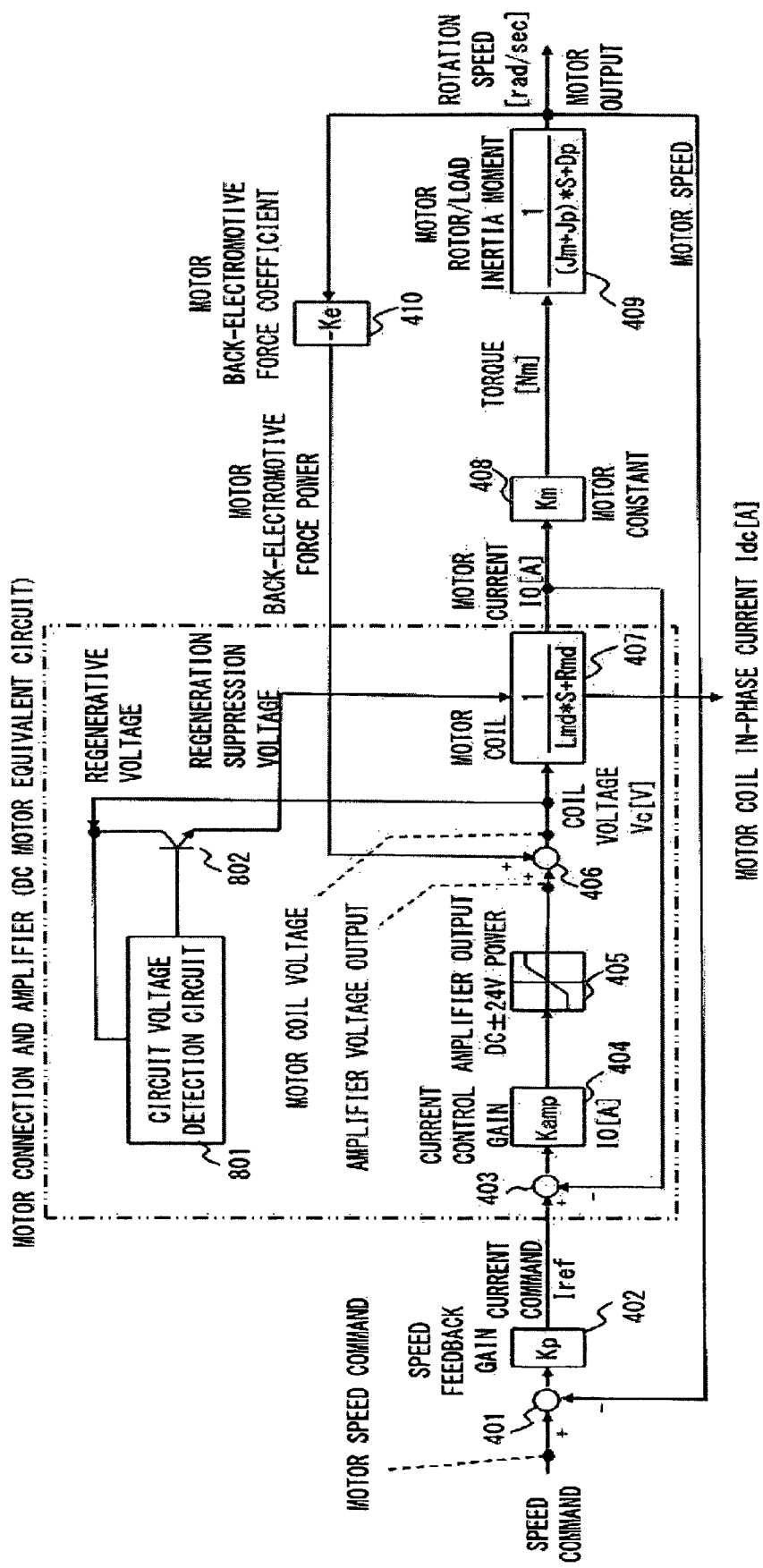
FIG. 5 is a block diagram showing the configuration of the control system which includes a regenerative power control apparatus according to an embodiment of the present invention in a mathematical model.

FIG. 5 shows the configuration of the control system which includes a regenerative power control apparatus according to an embodiment of the present invention in a mathematical model. Referring to FIG. 5, a speed control command is supplied to a speed feedback gain 402 through a subtracter 401 and further supplied to a current control gain 404 through a subtracter 403. The current value is converted into a DC±24 volt power in an output amplifier 405 and it is supplied as a coil voltage to a motor coil 407 through an adder 406.

The current of the motor coil 407 is fed back to the subtracter 403 and also produces torque through a motor constant 408. The torque is acquired as a rotation speed (motor output) through a motor rotor/load moment 409. The rotation speed is fed back to the adder 406 through a motor back-electromotive force coefficient 410 and also fed back to the subtracter 401. The feedback control of motor driving is performed in this manner.

In this configuration, the coil voltage which is output from the adder 406 is supplied to a regenerative voltage detection circuit 801 and a regenerative voltage is thereby detected. When the regenerative voltage becomes higher than a prescribed value, a switching device 802 becomes conductive, so that regeneration suppression current Idc which suppresses an excessive regenerative voltage is supplied to the motor coil 407. The regeneration suppression current Idc is also supplied in-phase to another motor coil (not shown).

Figure 6:
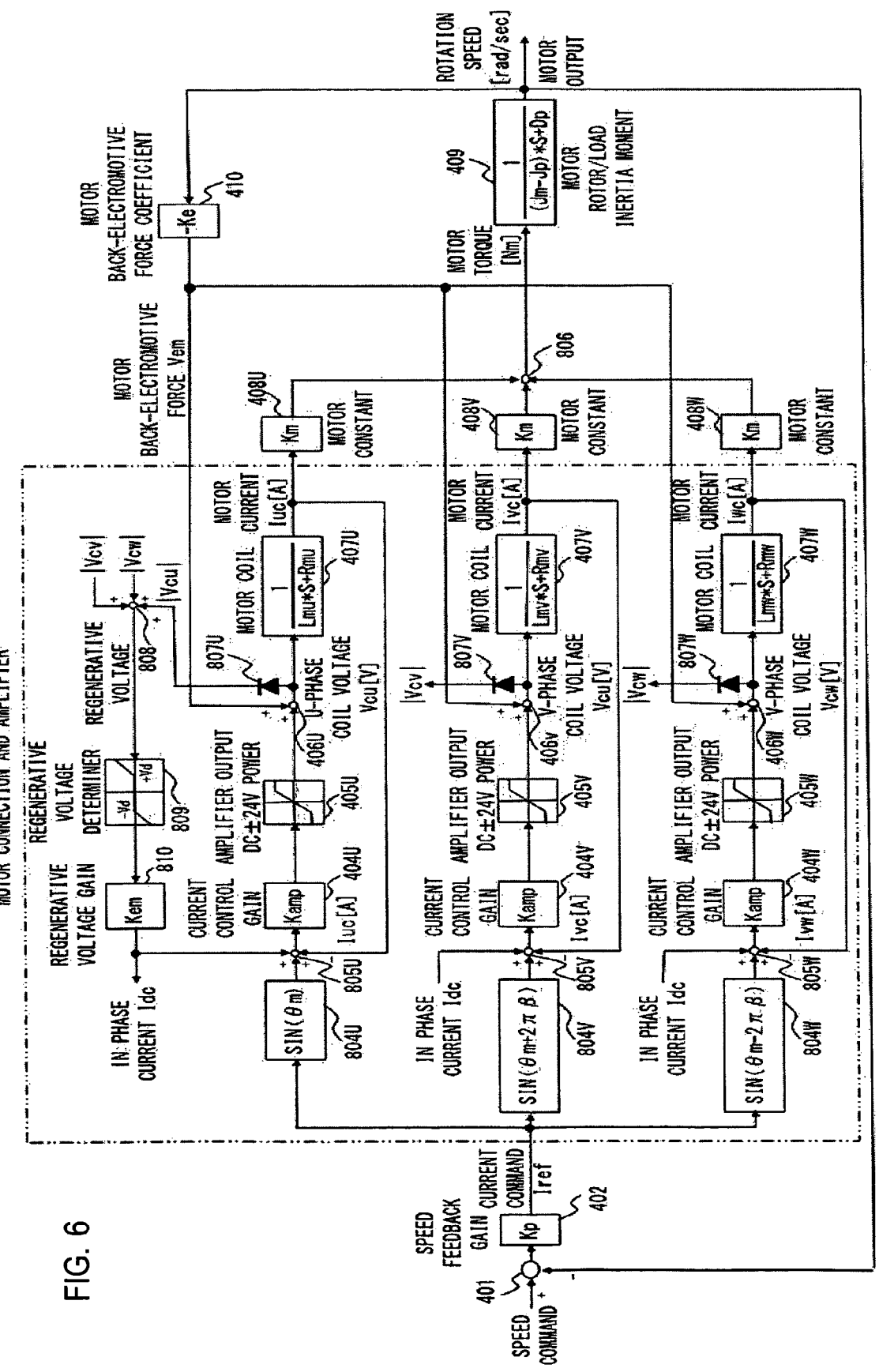
FIG. 6 is a block diagram showing the configuration of the control system which includes a regenerative power control apparatus according to an embodiment of the present invention in a mathematical model.

FIG. 6 shows the overall configuration where the above system is applied to the three-phase motor in a mathematical model. In the description of FIG. 6, the same elements as in FIG. 5 are denoted the same symbols with a suffix U, V or W indicating each phase, and redundant description is omitted.

Referring to FIG. 6, a current command Iref from the speed feedback gain 402 is supplied to the circuits 803U, 803V and 803W having the coefficient of sin(θm), sin(θm+2π/3) and sin(θm−2π/3), respectively, so that three-phase signals are generated. The three-phase signals are supplied respectively to adder-subtracters 805U, 805V and 805W, and the signals from the adder-subtracters 805U, 805V and 805W are respectively supplied to current control gains 404U, 404V and 404W. Further, the signals from the motor constants 408U, 408V and 408W are added together by the adder 806 to thereby produce motor torque.

Further, the coil voltages which are output from the adders 406U, 406V and 406W are respectively transferred to diodes 807U, 807V and 807W, and then added together by an adder 808. The signal is then supplied to a regenerative voltage determiner 809. When a regenerative voltage becomes excessive, in-phase current Idc is supplied through a regeneration control gain 810 to the adder-subtracters 805U, 805V and 805W. The regenerative current is thereby consumed, and because the regenerative current is supplied in-phase to each motor coil, the regenerative current does not affect control torque.

Thus, when U, V and W phase current are Iu, Iv, Iw [A], and a magnetic field which is orthogonal to each phase current is Mu, Mv and Mw [T], a motor torque Tm[Nm] is expressed, based on the above expressions 1 to 3, as:

$$Tm = Iu \times Mu + Iv \times Mv + Iw \times Mw[Nm] \quad \text{Expression 4}$$
$$= I0 * \sin(\theta m) \times M0 * \sin(\theta m) +$$
$$I0 * \sin(\theta m + 2\pi/3) \times M0 *$$
$$\sin(\theta m + 2\pi/3) + I0 *$$
$$\sin(\theta m - 2\pi/3) \times \sin(\theta m - 2\pi/3)$$
$$= 1.5 \times I0 \times M0$$

Because motor coil current (Iu, Iv, Iw) can be controlled independently, the following current, on which Idc is superposed, can be supplied:

$$Iuc = Iu + Idc = I0*\sin(\theta m) + Idc[A] \quad \text{Expression 5}$$
$$Ivc = Iv + Idc = I0*\sin(\theta m + 2\pi/3) + Idc[A] \quad \text{Expression 6}$$
$$Iwc = Iw + Idc = I0*\sin(\theta m - 2\pi/3) + Idc[A] \quad \text{Expression 7}$$

The motor torque Tm is expressed as follows, which corresponds to the expression 4:

$$Tm = Iuc \times Mu + Ivc \times Mv + Iwc \times Mw \quad \text{Expression 8}$$
$$= I0 * \sin(\theta m) \times M0 * \sin(\theta m) +$$
$$I0 * \sin(\theta m + 2\pi/3) \times$$
$$M0 * \sin(\theta m + 2\pi/3) +$$
$$I0 * \sin(\theta m - 2\pi/3) \times$$
$$M0 * \sin(\theta m - n\pi/3) +$$
$$Idc \times \left\{ \begin{array}{c} M0 * \sin(\theta m) + M0 * \\ \sin(\theta m + 2\pi/3) + M0 * \sin(\theta m - 2\pi/3) \end{array} \right\}$$
$$= 1.5 \times I0 \times M0[Nm]$$

where M0*sin(θm)+Mθ*sin(θm+2π/3)+M0*sin(θm−2π/3)=0

Figure 7:
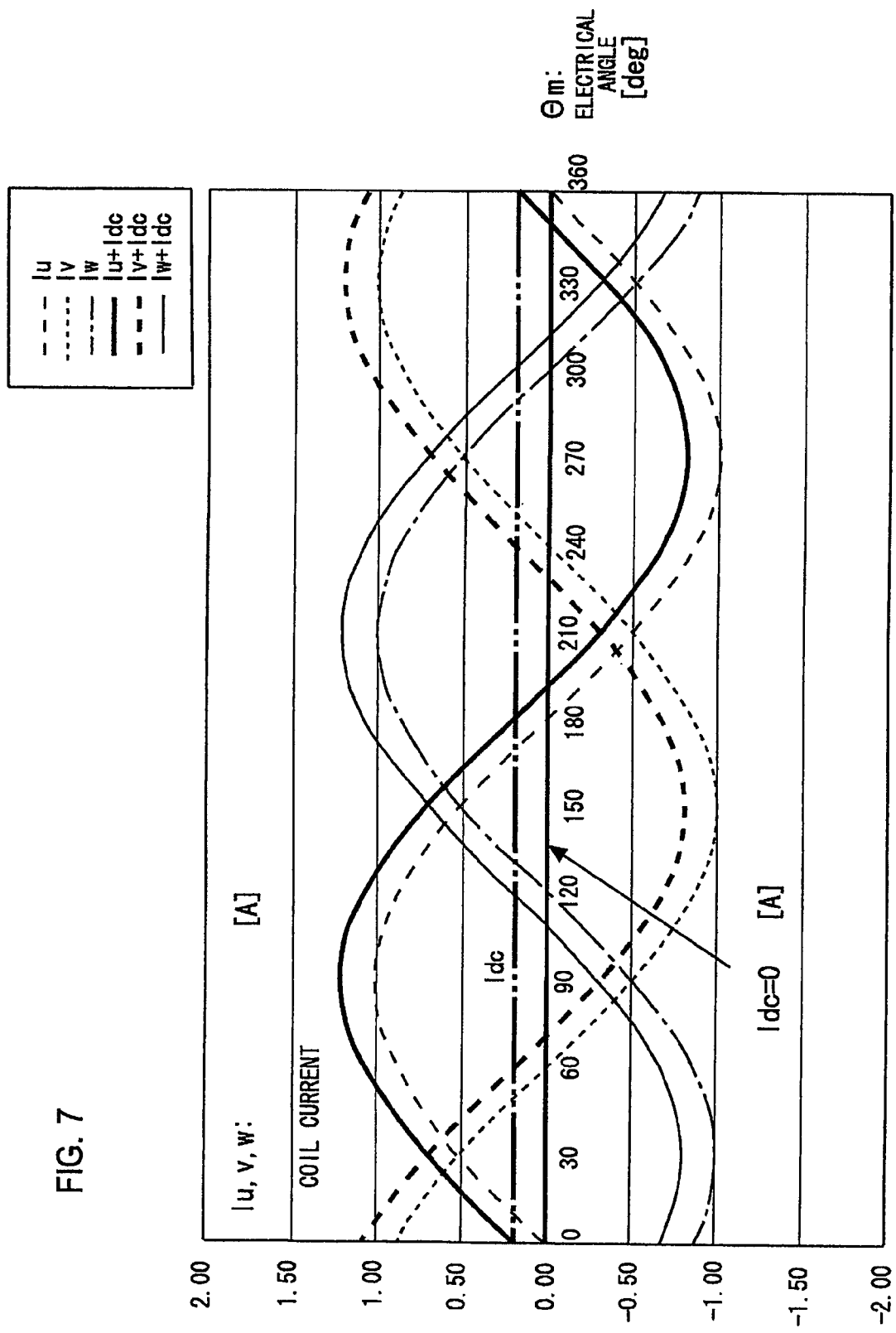
FIG. 7 is a view to describe the same.

Thus, the current Idc[A] which is superposed in common onto each phase does not affect torque in the above-described embodiment. Accordingly, if regenerative current Idc is fed through the motor coil when a regenerative power is generated, it is possible to suppress a regenerative voltage. Specifically, if current is fed through the motor coil as shown in FIG. 7, an increase in a regenerative voltage can be suppressed without causing interference with torque current. The effect of suppressing an increase in a regenerative voltage is the same as that described earlier in the related art.

According to the motor control apparatus and the motor control method of the present invention, it is possible to eliminate a regenerative power by sending it through motor coils without affecting torque control. It is thereby possible to eliminate the use of a large weight, large volume regenerative resistor or capacitor and thereby achieve size and weight reduction of a vehicle, a robot or the like in which the above motor is used.

Figure 8:
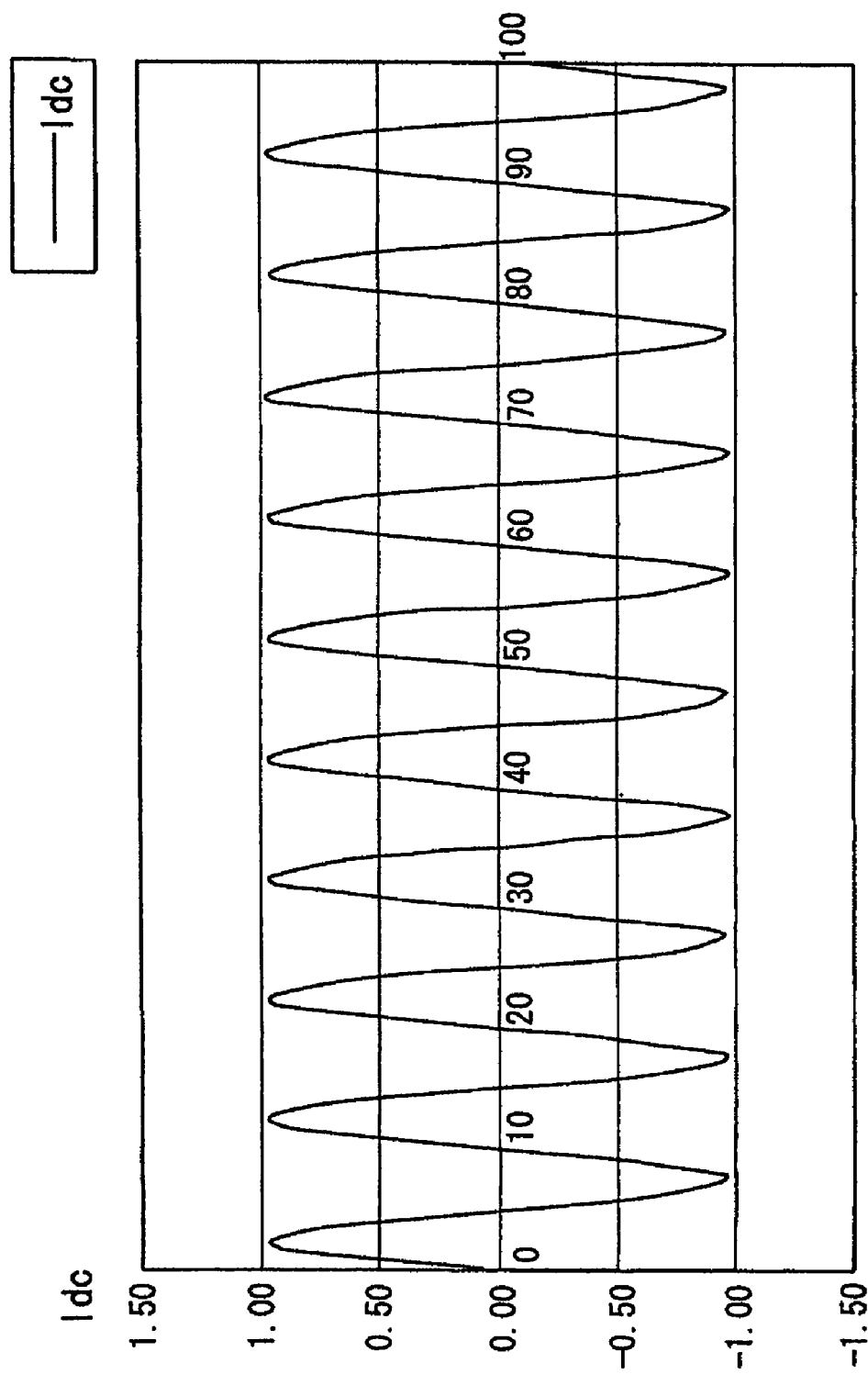
FIG. 8 is a view to describe the same.

The current Idc may be current having any waveform as long as it is in-phase. For example, the in-phase current Idc may be current with a waveform as shown in FIG. 8, which is not direct current. If a current signal which has an audible frequency band as shown in FIG. 8, including a frequency of 20 Hz to 20 kHz, is applied to the motor coil, the motor oscillates the body without interfering with a turning force, thereby generating a sound by the same principal as a speaker. This enables the control of the running torque of the motor and the implementation of a speaker function.

Figure 9:
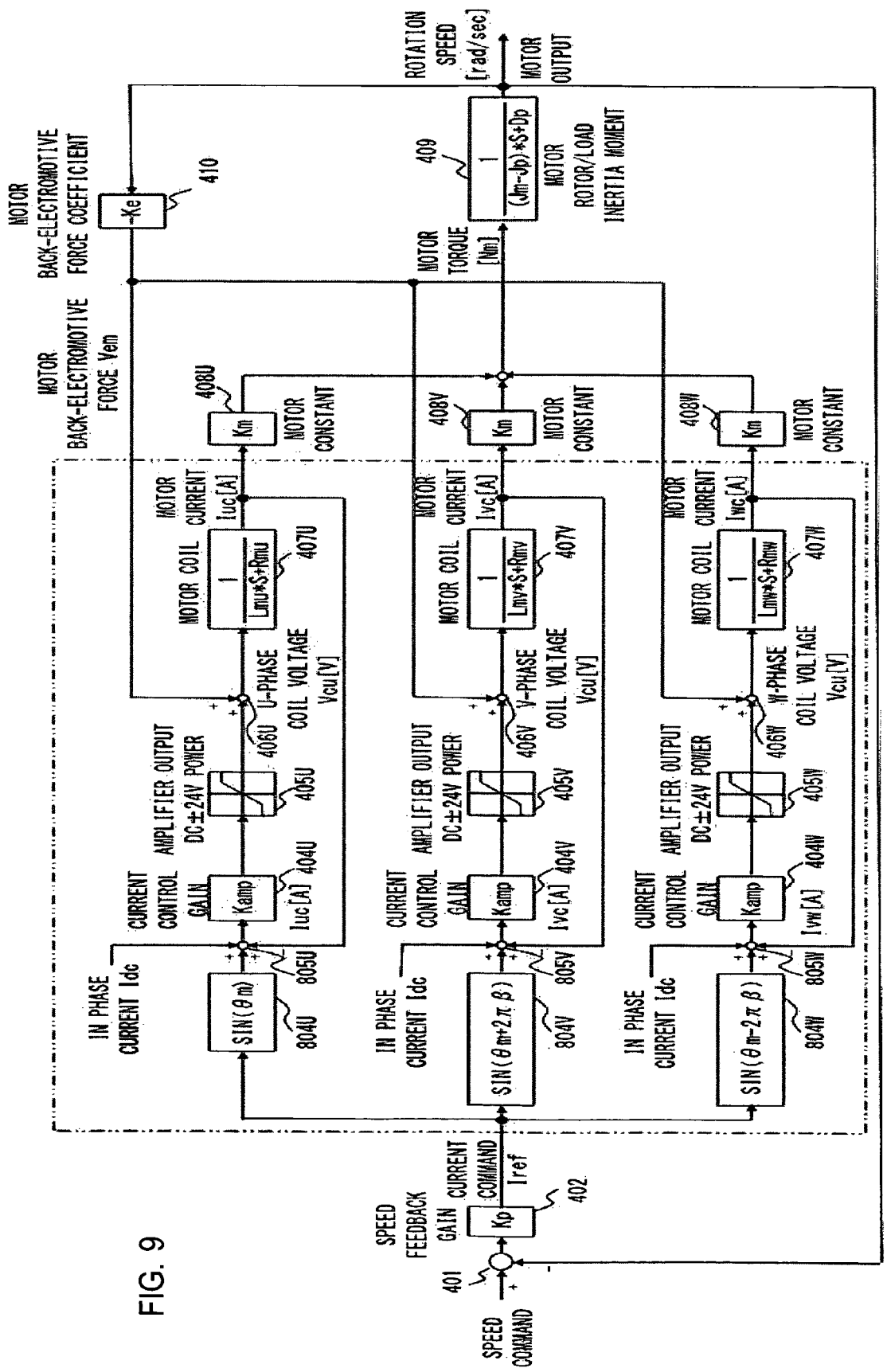
FIG. 9 is a block diagram showing the configuration of the control system which includes a regenerative power control apparatus according to an embodiment of the present invention in a mathematical model.

FIG. 9 shows the circuit configuration for the above function. Referring to FIG. 9, the in-phase current Idc which is supplied to the adder-subtracters 805U, 805V and 805W is modulated. The other elements are the same as those in FIG. 6. If the current which is supplied to the adder-subtracters 805U, 805V and 805W is in-phase with each other, it does not affect the torque control, and the oscillation by the modulation is generated in a motor body to thereby generate a sound. The sound may be used for making a warning sound or the like which is given before a regenerative voltage becomes excessive, for example.

Figure 10:
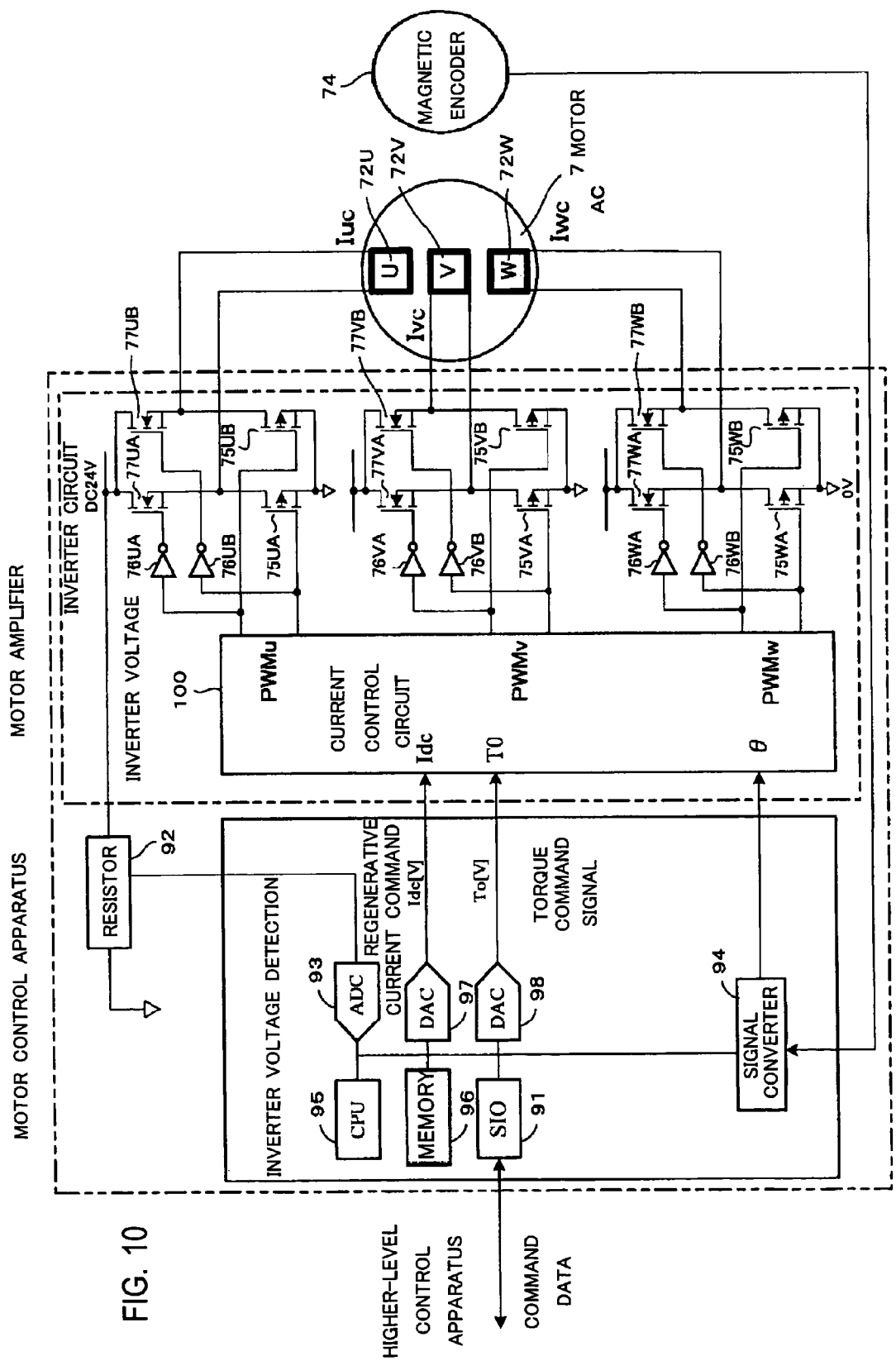
FIG. 10 is a view to describe the main part of the same.

FIG. 10 shows the configuration of a specific motor control circuit. Although this configuration employs the technique which is disclosed in Japanese Patent No. 3332226 by the inventors of the present invention, the present invention may be applied to a motor control circuit of another configuration. Referring to FIG. 10, in the motor control circuit, command data from a higher-level control apparatus is supplied through a serial input/output portion 91, and an inverter voltage is divided by a resistor 92 and supplied through an ADC 93. Further, a signal from an encoder 74 which detects the rotation phase of the motors 7 is supplied through a signal converter 94.

In the motor control circuit, a CPU 95 processes signals using program and data which are recorded in a memory 96, and the processed signals are supplied as a regenerative current command Idc and a torque command signal T0 to a current control circuit 100 through DACs 97 and 98. Further, an electrical angle signal E which is converted by the signal converter 94 is also supplied to the current control circuit 100. Then, PWM signals (PWMu, PWMv, PWMw), which correspond to each phase current, is generated in the current control circuit 100.

Figure 11:
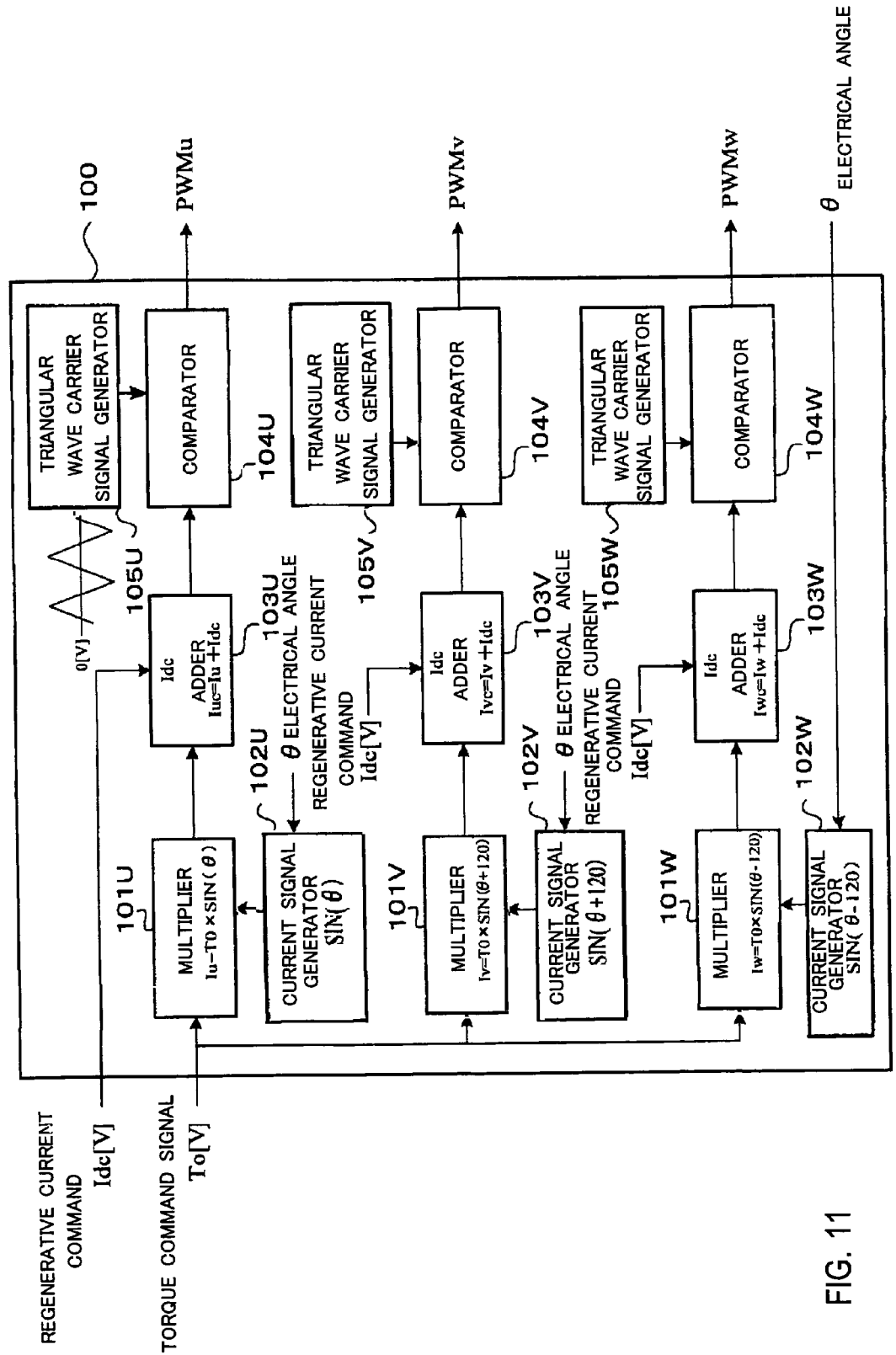
FIG. 11 is a view to describe the main part of the same.
Figure 12:
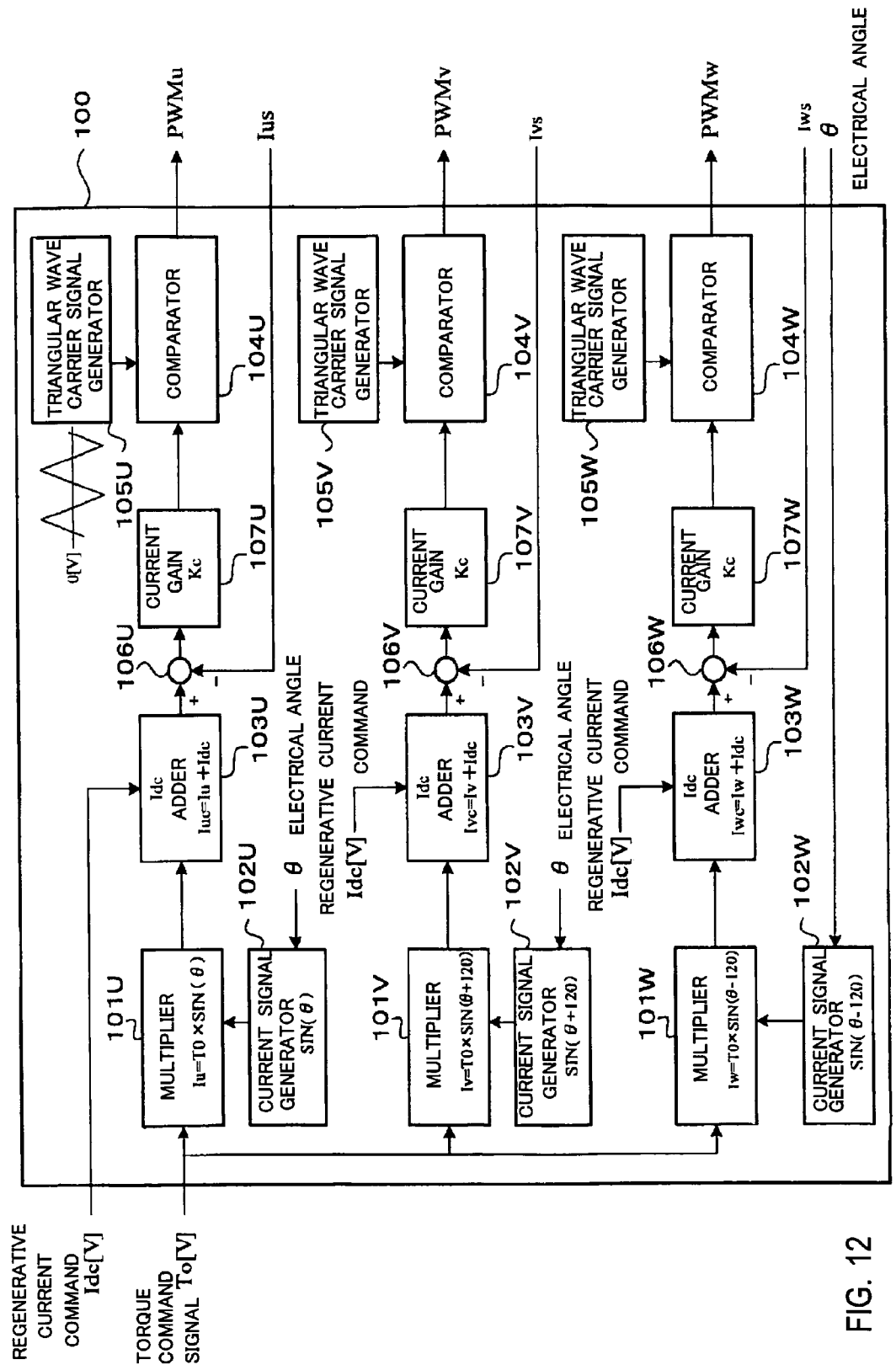
FIG. 12 is a view to describe the main part of the same.

FIGS. 11 and 12 show the specific configurations of the current control circuit 100. FIG. 11 shows the configuration in the case of employing open control, and FIG. 12 shows the configuration in the case of employing closed control. In the configuration of the open control shown in FIG. 11, a torque command signal T0 is supplied to multipliers 101U, 101V and 101W, and multiplied by signals sin(θ), sin(θ+120) and sin(θ−120) which are generated in current signal generators 102U, 102V and 102W, respectively, according to an electrical angle θ.

The signals of those products are respectively supplied to adders 103U, 103V and 103W and the in-phase regenerative current command Idc is added thereto. The signals are supplied to comparators 104U, 104V and 104W and compared with triangular wave signals from triangular wave carrier signal generators 105U, 105V and 105W, respectively, thereby generating the PWM signals (PWMu, PWMv, PWMw).

In the configuration of the closed control shown in FIG. 12, the signals from the adders 103U, 103V and 103W are supplied to subtracters 106U, 106V and 106W, and control signals Iu, Ivs and Iws are subtracted therefrom, respectively. The signals are then supplied to the comparators 104U, 104V and 104W through current gains (Kc) 107U, 107V and 107W. The PWM signals (PWMu, PWMv, PWMw) with the closed control are thereby generated.

In this manner, the above embodiment eliminates a regenerative power by sending it through motor coils without affecting torque control. It is thereby possible to eliminate the use of a large weight, large volume regenerative resistor or capacitor and thereby achieve size and weight reduction of a vehicle, a robot or the like in which the motor is used.

Specifically, according to the motor control apparatus of the embodiment of the present invention described above, for a motor which drives a permanent magnet using a plurality of drive coils, drive current is independently supplied to each of the plurality of drive coils, and a regenerative power which is generated by the motor is equally supplied to the plurality of drive coils. It is thereby possible to eliminate the use of a large weight, large volume regenerative resistor or capacitor and thereby achieve size and weight reduction of a vehicle, a robot or the like in which the motor is used.

Further, according to the motor control method of the present invention described above, for a motor which is driven by a plurality of drive coils, drive current is independently supplied to each of the plurality of drive coils, and a regenerative power which is generated by the motor is equally supplied to the plurality of drive coils. It is thereby possible to eliminate the use of a large weight, large volume regenerative resistor or capacitor and thereby achieve size and weight reduction of a vehicle, a robot or the like in which the motor is used.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A motor control apparatus that performs inversion control of a vehicle or a robot by controlling a motor that drives a permanent magnet using a plurality of drive coils, comprising:
   a plurality of drive coils connected in such a way that drive current is supplied independently to each of the plurality of drive coils; and
   a unit for supplying a regenerative power generated by the motor equally to each of the plurality of drive coils.

2. The motor control apparatus according to claim 1, wherein
   the motor has three-phase drive coils, and
   a regenerative power generated by the motor is equally supplied to the three-phase drive coils.

3. The motor control apparatus according to claim 1, wherein
   phase-shifted drive current is supplied to each of the plurality of drive coils, and
   the drive current is controlled so as to control drive torque.

4. The motor control apparatus according to claim 1, wherein
   the regenerative power equally supplied to the plurality of drive coils is modulated at an audible frequency, so that an audible sound is generated by the motor.

5. A motor control method to perform inversion control of a vehicle or a robot by controlling a motor driven by a plurality of drive coils, comprising:
   connecting a plurality of drive coils in such a way that drive current is supplied independently to each of the plurality of drive coils; and
   supplying a regenerative power generated by the motor equally to each of the plurality of drive coils.

6. The motor control method according to claim 5, wherein the motor has three-phase drive coils, and
   a regenerative power generated by the motor is equally supplied to the three-phase drive coils.

7. The motor control method according to claim 5, wherein phase-shifted drive current is supplied to each of the plurality of drive coils, and
   the drive current is controlled so as to control drive torque.

8. The motor control method according to claim 5, wherein the regenerative power equally supplied to the plurality of drive coils is modulated at an audible frequency, so that an audible sound is generated by the motor.

* * * * *

UNITED STATES PATENT AND TRADEMARK OFFICE
CERTIFICATE OF CORRECTION

| | |
|---|---|
| PATENT NO. | : 7,821,219 B2 |
| APPLICATION NO. | : 12/076895 |
| DATED | : October 26, 2010 |
| INVENTOR(S) | : Shinji Ishii |

It is certified that error appears in the above-identified patent and that said Letters Patent is hereby corrected as shown below:

| Column | Line | |
|---|---|---|
| 7 | 54 | Change "$sin(\theta m - 2\pi/3) \times sin(\theta m - 2\pi/3)$" to -- $sin(\theta m - 2\pi/3) \times M0*sin(\theta m - 2\pi/3)$ --. |
| 8 | 12 | Change "$M0*sin(\theta m - n\pi/3)$" to -- $M0*sin(\theta m - 2\pi/3)$ --. |
| 8 | 20 | Change "$M0*sin(\theta m)+M0*sin(\theta m+2\pi/3)+M0*sin$" to -- $M0*sin(\theta m)+M0*sin(\theta m+2\pi/3)+M0*sin$ --. |
| 9 | 11 | Change "angle signal E" to -- angle signal $\theta$ --. |

Signed and Sealed this
Fifteenth Day of March, 2011

David J. Kappos
*Director of the United States Patent and Trademark Office*